United States Patent
Teramoto et al.

(10) Patent No.: US 6,885,643 B1
(45) Date of Patent: Apr. 26, 2005

(54) METHOD AND DEVICE FOR FACILITATING EFFICIENT DATA TRANSFER VIA A WIRELESS COMMUNICATION NETWORK

(75) Inventors: Keiichi Teramoto, Tokyo (JP); Yoshiaki Takabatake, Kanagawa (JP); Junko Ami, Tokyo (JP); Kensaku Fujimoto, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 756 days.

(21) Appl. No.: 09/671,012

(22) Filed: Sep. 28, 2000

(30) Foreign Application Priority Data

Sep. 30, 1999 (JP) .................................... P 11-280651

(51) Int. Cl.⁷ .............................................. H04L 12/26
(52) U.S. Cl. .................... 370/252; 370/338; 370/463; 370/469
(58) Field of Search ................. 370/252–253, 370/338, 469, 231–236, 463, 329

(56) References Cited

U.S. PATENT DOCUMENTS

| | | | |
|---|---|---|---|
| 5,764,699 A | | 6/1998 | Needham et al. |
| 6,208,620 B1 | * | 3/2001 | Sen et al. .................... 370/231 |
| 6,272,148 B1 | * | 8/2001 | Takagi et al. ............... 370/469 |
| 6,301,609 B1 | * | 10/2001 | Aravamudan et al. ...... 709/207 |
| 6,480,889 B1 | * | 11/2002 | Saito et al. ................. 709/220 |
| 6,728,244 B1 | * | 4/2004 | Takabatake ................. 370/392 |
| 6,845,090 B1 | * | 1/2005 | Takabatake ................. 370/338 |

FOREIGN PATENT DOCUMENTS

| | | |
|---|---|---|
| EP | 0 844 769 | 5/1998 |
| JP | 8-116424 | 5/1996 |
| JP | 10-154996 | 6/1998 |
| JP | 10-164107 | 6/1998 |
| WO | WO 95/35002 | 12/1995 |

OTHER PUBLICATIONS

U.S. Appl. No. 09/343,509.*

* cited by examiner

*Primary Examiner*—Dang Ton
*Assistant Examiner*—Robert C Scheibel
(74) *Attorney, Agent, or Firm*—Oblon, Spivak, McClelland, Maier & Neustadt, P.C.

(57) ABSTRACT

A wireless network system capable of controlling highly efficient transfer of AV data by an upper application, using information indicating a wireless link condition that varies dynamically is disclosed. In this wireless network system, a wireless terminal and a wire gateway apparatus each store collected wireless link condition information in a descriptor. An upper application on the wireless terminal reads the descriptor at said terminal device and obtains wireless LAN link condition information. The wireless gateway apparatus makes notification to a wireless terminal of a VTR, for example, that actually exists in a 1394 terminal as if it existed as a sub-unit in the local terminal device. The wireless terminal accesses the collected wireless link condition information and selects a AV/C command to be sent to the VTR sub-unit of the wireless gateway apparatus. The wireless terminal transfers the play command for playback to the wireless gateway apparatus. The wireless gateway apparatus transfers the play command to a VTR sub-unit within a terminal on the wired network. In accordance with this action, the VTR sub-unit within the terminal on the wired network starts transfer of AV data.

23 Claims, 16 Drawing Sheets

METHOD AND DEVICE FOR FACILITATING EFFICIENT DATA TRANSFER VIA A WIRELESS COMMUNICATION NETWORK

BACKGROUND OF THE INVENTION

1. Field of the Invention

The present invention relates to a wireless terminal device, a gateway device, and a wireless data transfer control method. In particular, it relates to technology in a data communication system which executes an upper application such as an AV (audio/video) protocol as to a wireless network exhibiting dynamic variations in the condition of the wireless link or in an integrated network system encompassing a wireless network and wired network so as to perform efficient transfer of content data.

2. Related Art

With the recent increase in the use of digital equipment, the implementation of networks in the home has gained attention. At present, the IEEE Std 1394 (hereinafter abbreviated IEEE 1394), which was devised as a connecting wired for connection between AV equipment, has gained attention as a home-use network media. The IEEE 1394 is a high-speed bus capable of connection between a plurality of terminals by a daisy chain or star-configured connection, with transfer of broad bank data performed at speeds exceeding 100 Mbps. It is possible on a single wired to perform transfer both asynchronous data and isochronous data.

The achievement of high speeds in wireless networks (wireless LANs) is also gaining attention, and wireless LAN products conforming to IEEE Std 802.11 have already appeared and are going through a process of price reduction. Along with advancing speeds and price reductions for such wireless technology, there are active efforts being made to apply this wireless technology in the home network as well. In the US, such industry groups as Home RF and Bluetooth have been established, and great advances are expected in the future.

A high-speed, low-cost wireless network is thought to be highly acceptable for use in the home network. For this reason, a system that combines a high-speed, low-cost wireless LAN and the IEEE 1394 is expected to form the core of home networks in the future.

However, in an environment in which the IEEE 1394 bus is integrated with a wireless LAN, there are a number of problems.

The first problem is that protocols executed on the IEEE 1394 bus (for example, the AV/C Digital Interface Command Set General Specification, IEEE 1394-1995), were originally developed with the assumption of execution on a wired medium, and did not envision execution in a wireless environment. However, in contrast to a wired network, it is known that there are changes related to the condition of the wireless link (for example, the bandwidth that can be used for transmission). To accommodate such wireless link condition changes, a method (such as fallback) is employed, wherein the wireless transfer speed (or type of modulation to be used) is established, for example, when the wireless LAN is started up, so as to start data communication at transfer speed suited to the wireless link condition. For this reason, when executing an upper layer protocol such as AV/C in a wireless environment, unless the condition of the lower layers is known, a problem can be envisioned such as when a request is made of a lower layer for transfer of content data (such as AV (audiovisual) data) which in reality cannot be transferred.

In current wireless LAN specifications (such as Bluetooth), however, there are no functions for "acquiring condition information of the wireless link" or "notify an upper application of the condition of the wireless link." Additionally, because upper applications on the IEEE 1394 (such as the AV/C Protocol) were devised with the assumption of execution in a wired network, these upper applications also lack an "information element for holding link condition information" and a function for "acquiring link condition information."

In the case in which AV data is transferred on a medium in which the link condition (such as usable transmission bandwidth) varies, such as in a wireless network, when an upper layer protocol (upper application) such as AV/C is executed, it was not possible to ascertain the condition of the link, which represents a downstream layer. For this reason, it was difficult to select the AV data type and transfer rate usable on the linked to be used and to perform smooth, efficient AV data transfer.

SUMMARY OF THE INVENTION

Accordingly, it is an object of the present invention to provide a wireless terminal device, a gateway device, and a wireless data transfer control method in an environment exhibiting dynamic variations, such as a wireless environment, or an environment in which there is connection between a wired network and a wireless network, which enable efficient data transfer processing, giving consideration to variation in the condition of the wireless link.

A feature of the present invention is that the condition of a dynamically varying wireless link condition information is disclosed to an upper application, and that a determination of whether or not data transfer is possible is made, and the transfer parameters for AV (audio/video) content data being established in accordance with the wireless link condition.

An aspect of the present invention is a terminal device for control of data between communicating entities on a network via a wireless link comprising an interface section for performing sending and receiving of packets with a remote communicating entity, a link setting section for setting a link for control and for data transfer with the remote communicating entity, a wireless link information acquisition section for acquiring wireless link information indicating the condition of a wireless link between said terminal device and a remote communicating entity in the network t the time of setting the link, and for updating the wireless link information acquired at the time of setting the link by the current dynamically acquired wireless link information, a wireless link information storage section for storing the above-noted acquired or updated wireless link information, and an application section for, based on the wireless link information stored in the wireless link information storage section, for determining whether or not data can be transferred and, if data transfer is possible, optimizing a transfer parameter for transfer of data with the remote communicating entity, in accordance with the wireless link information, this transfer parameter being used to receive data from or send data to the remote communicating entity, via the interface section.

It is possible to use the Descriptor in the SDP Protocol, for example, as a wireless link information storage means.

It is preferable that the wireless link information stored in the wireless link information storage section includes wireless link information with regard to said terminal device and wireless link information with regard to the remote communicating entity.

It is preferable that the wireless link information acquisition section includes
- a remote wireless link information requesting section for requesting notification of wireless link information with regard to the remote communicating entity that the remote communicating entity has, at the time of startup by the application section, and
- a remote wireless link information receiving section for receiving wireless link information of the remote communicating entity, notification of which is made from the remote communicating entity.

It is preferable that the terminal device further has a wireless link information updating section for changing wireless link information stored in the wireless link information storage section to a format interpretable by the application section and for passing this wireless link information to the application section.

It is preferable that the wireless link storage information section store wireless link information as information relating to a constituent element of said terminal device.

It is preferable that the SubUnit defined in the AV/C Protocol be used as the constituent element.

It is preferable in the present invention further have a wireless link monitoring section for monitoring the condition of a wireless link in the network, for outputting wireless link information acquired by the monitoring to the wireless link information acquisition section. It is possible to use HCI as a wireless link condition monitoring means.

It is preferable that the terminal device further has a local wireless link information sending section for sending wireless link information of said terminal device to the remote communicating entity, in response to a request from the remote communicating entity.

It is preferable that the terminal device further has a user interface section for, based on wireless link information stored in the wireless link Information storage section, providing to a user a list of data candidates for transfer, and waiting for input from the user of data selected from the list.

It is preferable that the wireless link information includes at least one of the packet discard rate, the usable bandwidth, the number of usable channels, the usable transfer rate, or observable information on which these are based.

It is preferable that the transfer parameter be at least one of an AV/C command or content data to be transferred.

By doing the above, it is possible for an upper application to consider, for example, a dynamically varying network condition, in making a selection of a type of operation (command) with respect to AV data (content data), and is also possible to make selection of AV data to be accessed from a plurality of AV data.

Another aspect of the present invention is a terminal device for transfer of data between communicating entities over a network via a wireless link, this device having:
- an interface section for performing sending and receiving of packets with a remote party,
- a link setting section for setting a link for control and for data transfer with the remote communicating entity,
- a wireless link information acquisition section for acquiring wireless link information indicating the condition of a wireless link between said terminal device and a remote communicating entity in the network at the time of setting the link, and for updating the wireless link information acquired at the time of setting the link by the current dynamically acquired wireless link information,
- a wireless link information storage section for storing the above-noted acquired or updated wireless link information, and
- a local wireless link information notification section for receiving from the remote communicating entity a request for the local wireless link information of said terminal and for sending the local wireless link information to the remote party.

Another aspect of the present invention is a gateway device for controlling transfer of data between a first terminal device on a wired network and a second terminal device on a wireless network, this gate device comprising,
- a first interface section for sending and receiving packets via the wireless network,
- a second interface section for sending and receiving packets via the wired network,
- a first link setting section for setting a link for control and for data transfer with the second terminal device,
- a second link setting section for setting a link data transfer with the first terminal device,
- a wireless link information acquisition section for acquiring wireless link information indicating the condition of a wireless link between said terminal device and the second terminal device on the wireless network at the time of setting the link, and for updating the wireless link information acquired at the time of setting the link by the current dynamically acquired wireless link information,
- a wireless link information storage section for storing the above-noted acquired or updated wireless link information, and
- a network connection processor for, based on wireless link information stored in the wireless link information storage section, performing receiving or sending of data between the first terminal device and the second terminal device via the first interface section and second interface section.

This gateway device further has a proxy means which uses a device on the wired network, or a service or sub-unit on such a device as belonging to said device, disclosing this to the wireless network side. The wireless network is, for example, Bluetooth, IEEE Std 802.11 or the like. The wired network is, for example, the IEEE 1394 bus.

It is preferable that this gateway device further comprises a local wireless link information sending section for, in response to a request from the first terminal device on the wired network or from the second terminal device on the wireless network, sending the local terminal wireless link information to the first terminal device or the second terminal device, respectively.

It is preferable that the wireless link information acquisition section of this gateway device includes
- a remote link information requesting section for requesting notification of remote link information of the first terminal device to the first terminal device on the wired network, and
- a remote link information receiving section for receiving remote link information, notification of which is made by the first terminal device.

Another aspect of the present invention is a method for controlling transfer of data via a wireless link with a remote communicating entities on a network, this method having
- a step of setting a link for control with a remote communicating entity,
- a step of acquiring wireless link information indicating the condition of a wireless link between said terminal device and a remote communicating entity on the network at the time of setting the link, a step of setting a link for data transfer with the remote communicating entity, a step of updating wireless link information acquired at the time of setting of the link with current dynamically acquired wireless link information acquired after the setting of the link for data transfer, a step of determining whether or not transfer of data is possible, based on the updated wireless link information, and a step of optimizing a parameter for transfer of data with the remote communicating entity, in accordance with the wireless link information in the case in which data transfer is possible and performing receiving or sending of data with the remote communicating entity, using the optimized parameter for transfer.

It is preferable in this control method that the wireless link information include wireless link information with regard to said terminal device and information with regard the remote communicating entity.

It is preferable in this control method that the wireless link information updating step includes a step of requesting notification of remote link information of the remote communicating entity to the remote communicating entity at the time of the startup by an application, and a step of receiving wireless link information of the remote communicating entity, notification of which is made by the remote communicating entity.

Another aspect of the present invention is a method for transfer of data via a wireless link with a remote communicating entity on a network, this method having a step of setting a link for control with the remote communicating entity, a step of acquiring wireless link information indicating the condition of a wireless link between said terminal device and the remote communicating entity on the network at the time of setting the link, a step of setting a link for data transfer with the remote communicating entity, a step of updating the wireless link information acquired at the time of setting of the link with current dynamically acquired wireless link information acquired after the setting of the link, and a step of receiving a notification request sent from the remote communicating party for said terminal device wireless link information of said terminal device, and sending wireless link information of said terminal device to the remote communicating entity in response to this request.

Another aspect of the present invention is a method of controlling transfer of data between a first terminal device on a wired network and a second terminal device on a wireless network, this method having a step of setting a link for control with the second terminal device, a step of acquiring, at the time of setting of the link, wireless link information indicating the condition of a wireless link between said terminal device and the second terminal device on the wireless network, a step of setting a link for data transfer with the second terminal device, a step of updating the wireless link information acquired at the time of setting the link with current dynamically acquired wireless link information acquired after the setting of the link for data transfer, a step of setting a link with the first terminal device, and a step of performing receiving or sending of data between the first terminal device and the second terminal device, based on the wireless link information.

Other features and advantages of the present invention will become apparent from the following descriptions, taken in conjunction with the accompanying drawings.

BRIEF DESCRIPTION OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

DETAILED DESCRIPTION OF THE PREFERRED EMBODIMENTS

Figure 1:
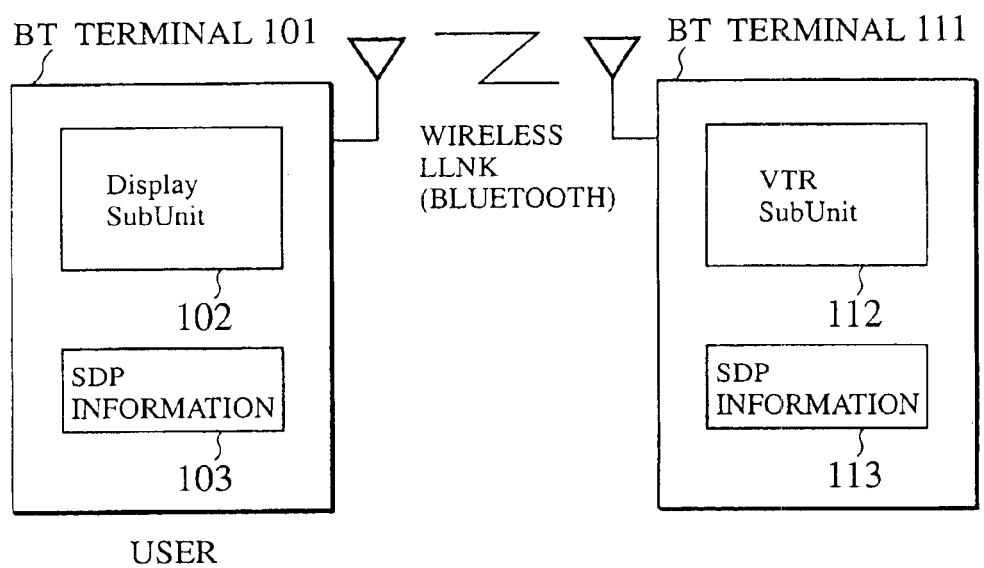
FIG. 1 is a block diagram showing an example a home-use wireless AV network system using a terminal device according to a first embodiment of the present invention.

Preferred embodiments of a wireless terminal device, a gateway device, and a method for data transfer control according to the present invention are described in detail below, with reference being made to relevant accompanying drawings.

First Embodiment

A wireless network system according to the first embodiment of the present invention is described in detail below, with reference made to FIG. 1 to FIG. 5.

In the first embodiment, a wireless terminal performing communication using a wireless LAN such as Bluetooth, for example, has function for obtaining wireless link condition information from a local terminal or collected it from another terminal and storing this information. Additionally, the first embodiment has function for giving notification of or disclosing to an upper application (for example AC/V protocol) wireless link condition information collected by the above-noted information collection function, function for storing this notified information, and function for using this wireless link condition information to control the execution of the upper application. By doing this, it is possible to use the wireless link condition information to control the execution of an upper application.

More specifically, the above-noted "wireless link condition information" includes the type of transfer system (link type) usable, the condition of the transfer system (usable bandwidth and usable number of channels), the packet discard rate, the version information of the wireless link, the electrical power mode, the data compression ratio, the data encoding method, or observable information forming the basis of these types of information on the wireless link.

For example, this wireless link condition information is held as Descriptor information defined in the SDP Protocol of Bluetooth, and Descriptor information defined in the AV/C Protocol, thereby enabling an upper AV application to efficiently execute AV data transfer using this wireless link condition information. If this type of wireless link condition information is held as Descriptor information, because it is possible to access not only wireless link condition information in the local terminal device but also such information from another terminal, it becomes possible to easily execute an AV application with consideration given to this dynamically changing wireless link information.

According to the first embodiment, it is possible to easily achieve data transfer such as transfer of AV data (content data) using a medium such as a wireless environment, in which the link condition constantly changes. Additionally, even in a network environment such as the IEEE 1394, in which a connection is made between a wired network and a wireless network, it is possible to perform AV data transfer while consideration is given to the link condition in the wireless network.

In the description that follows, the assumptions are those of a wireless LAN system having means for collecting service information of each wireless terminal (such as the SDP (Service Discovery Protocol) of Bluetooth), and of the case in which execution of the AV/C Protocol application as an upper application, which is a transfer control method for AV data on the IEEE 1394 bus.

The SDP in Bluetooth assumes, at a terminal in a Bluetooth network, a method of storing information such as vender types and corresponding service types for each terminal, and an executable protocol stack that can be stored, and a protocol for exchange of this information (service information) between each of the terminals. The assumption is that means for storing this service information is that of a Descriptors defining databases into which hierarchal storage is made of each service. In the SDP, hierarchal service classes are defined, services handled by the SDP being assigned to each class.

FIG. 1 shows an example of the basic configuration for transfer of AV data between wireless terminals (101 and 111) connected by a wireless link.

In this case, Bluetooth will be taken as the example of the wireless link. Therefore, the wireless terminal in this case is a Bluetooth terminal (the BT terminals 101 and 111).

As shown in FIG. 1, the BT terminal 101 has a display function, this display function existing as a Display_SubUnit 102, which is one functional unit (SubUnit) in the AV/C Protocol. In the BT terminal 101, SDP information 103, which is acquired, collected and stored service information or the like on the Bluetooth in accordance with an SDP protocol, which constitutes an information acquiring means.

The BT terminal 111 has a VTR function, and a VTR_SubUnit 112 as a functional element in the AV/C Protocol. There is also an SDP information 113 in accordance with the SDP protocol, which is a collection means for service information and the like in Bluetooth.

This AV/C Protocol recognizes each node in terms of Units, and recognizes constituent elements within each node (such as the Display of the BT terminal 101 and the VTR of the BT terminal 111) as sub-units. In the transfer protocol for AV/C control commands (for example, commands such as "play", "stop" and "fast forward"), the sending of a command and the receiving of the response thereto are treated as one set.

Because the BT terminal 101 and the BT terminal 111 are connected by means of a wireless link (Bluetooth), at what rate AV data existing within the VTR_SubUnit of the BT terminal 111 can be transferred to the BT terminal 101 is established by the condition of the wireless link. Specifically, this transfer rate is established by (1) what type of link is used to transfer AV data (for example, ACL (Asynchronous Connectionless) or SCO (Synchronous Connection-Oriented)) on the wireless link (Bluetooth) and (2) the condition of the wireless link, such as how much noise there is on the wireless link (this noise condition affecting the rate at which data can be transferred). For this reason, in the case in which an AV application at upper layer executes AV data transfer via a wireless link such as Bluetooth, it is necessary for the AV application to obtain the condition information of Bluetooth via some means such as the SDP and to execute a data transfer related protocol such as the AV/C Protocol based on this condition information.

Figure 2:
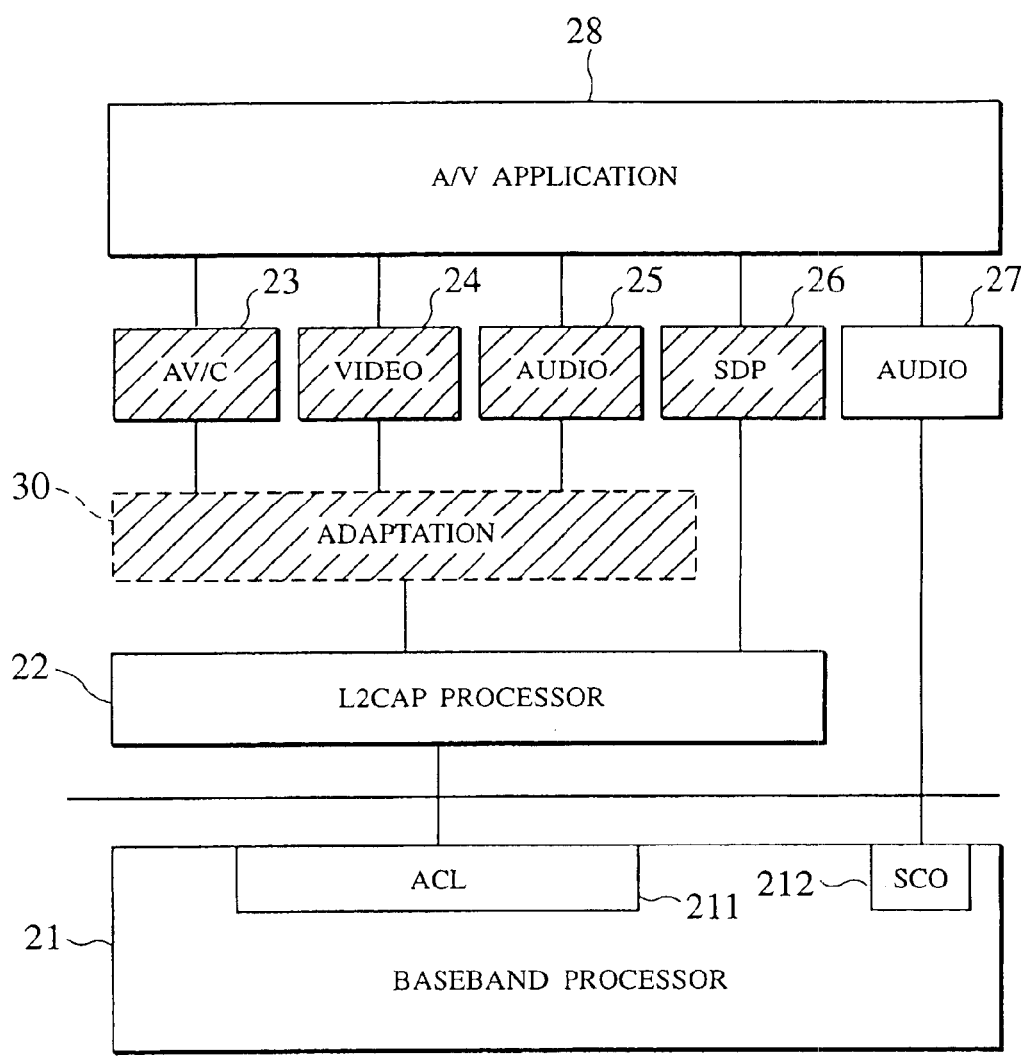
FIG. 2 is a drawing showing an example of a protocol stack within a wireless terminal device for the case of performing AV data transfer using Bluetooth.

FIG. 2 shows an example of a protocol stacking BT terminal having a function that collects and stores condition information with regard to a wireless link.

In FIG. 2, an L2CAP processor 22 that executes a data link layer specification (L2CAP) using an ACL transfer mode 211 of Baseband processor resides on a Baseband processor 21, which is the physical layer specification of Bluetooth. An Audio 27 executing processing such as processing for voice telephone resides as an upper protocol that uses the SCO transfer mode 212 of the Baseband processing. Additionally, an AV/C protocol 23 is defined, along with AV data protocol such as an Audio 25 and Video 24 and the like, as an upstream protocol using the above-noted L2CAP processor 22.

Additionally, an SDP protocol 26 is defined in a parallel position with these upper protocols. In the first embodiment, the example shown is that in which an AV application 28 is executed while using these upper protocols. While protocols in addition to the above, such as the RFCOMM protocol, are defined in Bluetooth, these are omitted, since they are not directly related to the first embodiment. In the drawing, reference numeral 30 denotes a transport protocol such as an adaptation layer protocol 30 (for example, RTP (Realtime Transport Protocol)).

Because the BT terminals 101 and 111 have the protocol configurations shown in FIG. 2, in the case in which the AV application 28 is executed and AV data sending and receiving processing is performed between the BT terminal 101 and the BT terminal 111, the AV application 28 acquires wireless link condition information via the SDP protocol 26 and executes the AV/C Protocol 23 after interpreting this wireless link condition information. In accordance with AV/C commands sent to the AV/C protocol 23, AV data is transferred via the protocol to the Audio 25 and the Video 24, for example.

In the current Bluetooth specifications, one specific method of acquiring the above-noted wireless link condition information that can be envisioned is that in which an HCI protocol (Host Controller Interface) defined as a Bluetooth protocol is provided at either the BT terminal 101 or the BT terminal 111, and a "collect wireless link condition information" command is executed by the API (Application Programming Interface) of this protocol.

Figure 3:
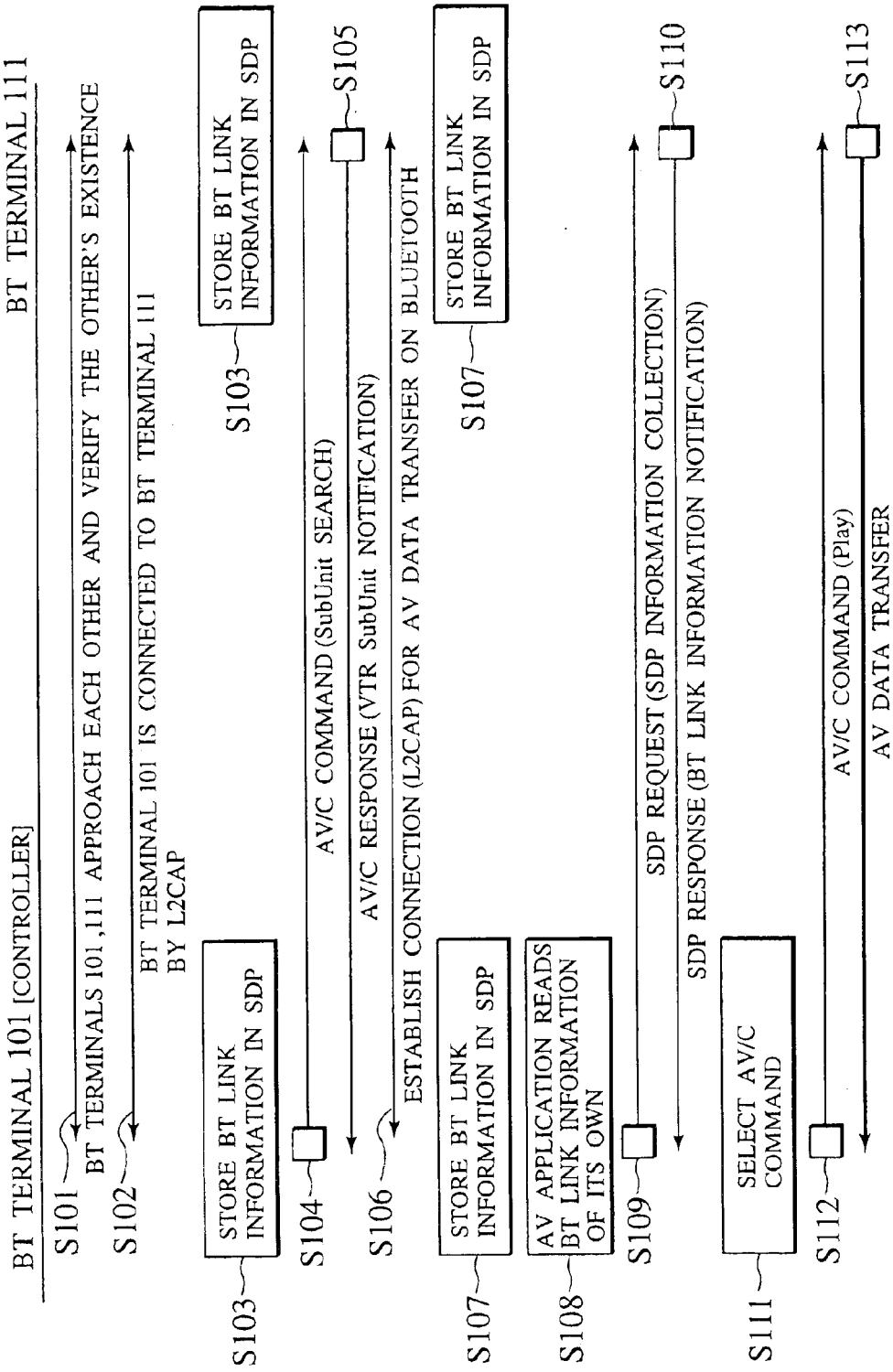
FIG. 3 is a drawing showing an example of a packet transfer processing sequence between wireless terminals in the first embodiment of the present invention.

FIG. 3 shows an example of the processing sequence in which, in the wireless communication between BT terminals having the hardware configuration shown in FIG. 1, the BT terminal 101 serves as a controller, AV data (that is, data that is stored in the VTR_SubUnit of the BT terminal 111) being readout via Bluetooth for viewing or the like. The specific sequence is as follows.

(1) BT terminal 101 and BT terminal 111 approach one another and each recognizes that it is in a region enabling communication with the other (processing performed by the Baseband processor 21) (step S101).

(2) A connection is set up between the BT terminal 101 and the BT terminal 111 for the purpose of transfer of an AV/C command therebetween (processing performed by the L2CAP processor 22) (step S102).

(3) The BT terminal 101 and the BT terminal 111 use a protocol (HCI) on the Bluetooth to collect wireless link condition information (in particular, ACL link information) in which processing step (2) caused a change, and use the SDP protocol to store same within a Descriptor. In this case, the SDP information (103, 113) in FIG. 1 corresponds to the Descriptor used in the SDP Protocol (step S103). Initialization information with regard to the wireless link condition is stored within the Descriptor, this initialization information being replaceable by the information collected in processing step (3), as appropriate.

(4) The BT terminal 101 uses the SubUnit_Info command of the AV/C Protocol to collect SubUnit information existing in the BT terminal 111. What is used for this is a logical connection on the L2CAP set at (2) (step S104).

(5) The BT terminal 111 makes notification of an AV/C response to the BT terminal 101 to the effect that the VTR_SubUnit 1112 exists as a SubUnit within the local terminal device (step S105).

(6) The BT terminal 101 sets a logical connection on Bluetooth for the purpose of receiving AV data from the BT terminal 111 (processing performed by the L2CAP processor 22).

(7) The BT terminal 101 and the BT terminal 111 use a protocol (HCI) on the Bluetooth to collect wireless link condition information (in particular, ACL link information) in which (6) caused a change, and use the SDP protocol to store same within a Descriptor (103, 113) (step S107).

(8) An AV application at the BT terminal 101 reads the Descriptor information in the SDP protocol of the local terminal device, and obtains link condition information in Bluetooth (step S108).

(9) An AV application at the BT terminal 101, in order to read the Descriptor information on the SDP protocol of the BT terminal 111, sends an SDP_Request command to the BT terminal 111 (step S109).

(10) The BT terminal 101 gives notification of the Descriptor information in the SDP protocol of the local terminal to the BT terminal 101. The Descriptor information with regard to which notification is given from the BT terminal 111 is appended as Descriptor information of the SDP protocol of the BT terminal 101 and stored. By doing this, the AV application at the BT terminal 101 acquires link condition information on Bluetooth at the BT terminal 111 side (step S110).

(11) An AV application at the BT terminal 101 accesses the wireless link condition information collected by the processing steps (8) to (10), and selects an AV/C command to send to the VTR_SubUnit of the BT terminal 111. At this point, whether or not AV data transfer can be done, and also the selection of the AV data to be played and the transfer rate are specified with consideration to the wireless link condition information, and other various transfer parameters of processing details and the processing method can be made selectable (step Sill). Additionally, it is possible for the above selection to be made by the intervention of a user. For example, a GUI can be used to present a list of AV content that can be transferred and viewed, in response to the wireless link condition information, the user being caused to select from this content the desired AV content.

(12) The BT terminal 101 sends an AV/C command (play command) for the purpose of playing back desired AV data, for example, using a transfer parameter established at the processing (11) to the BT terminal 111 (step S112). What is used at this point is a logical connection on the L2CAP set at the processing (6).

(13) The BT terminal 111 starts the AV data transfer in response to the Play command (step S113). What is used at this point is the logical connection on the L2CAP set at the processing (6).

By performing processing as described above, the AV data transfer at the wireless terminals can be executed according to the wireless link condition thereof.

The Bluetooth link condition information (wireless link condition information) collected in processing steps (3) and (7) of the above processing sequence can be envisioned as being, for example, a type of transfer that can be used on the Bluetooth at this point (for example, ACL or SCO) and conditions of that transfer method (such as bandwidth information or channel information). Notice can also be made of the version information of the Bluetooth (for example, Ver. 1 or Ver. 2) and the operating electrical power mode of the Bluetooth (for example, high-power mode or low-power mode). Additionally, it can be envisioned that notification is given of the data link layer information, such as the number of logical connection settings on the L2CAP. If possible, BT terminal hardware information (for example, wireless processing section function information and version information of the protocol being followed) can also be captured as part of the wireless link condition information. An upper AV application, in response to this wireless link condition information, can perform processing such as establishing whether or not data transfer can be done, changing the data transfer rate, or retrying the transfer.

In the processing steps (3) and (7) of the above processing sequence, however, it is not necessarily possible to directly collect such link condition information itself, such as usable transfer type (ACL or SCO) or bandwidth information and mode. The reason for this is that the information that can be collected from the ACI that is defined in the HCI is information that is only recognized within that protocol, and there are cases in which information itself, such as a specific bandwidth is not collected (for example, when the packet discard rate or number of channels being used is collected). For this reason, there are cases in which the SDP protocol 26 or an AV application 28 at the BT terminal 101 must rewrite (convert) the obtained wireless link condition information into information that has meaning to the AV application 28, such as the bandwidth information or Bluetooth mode information, in order to perform processing.

Figure 4:
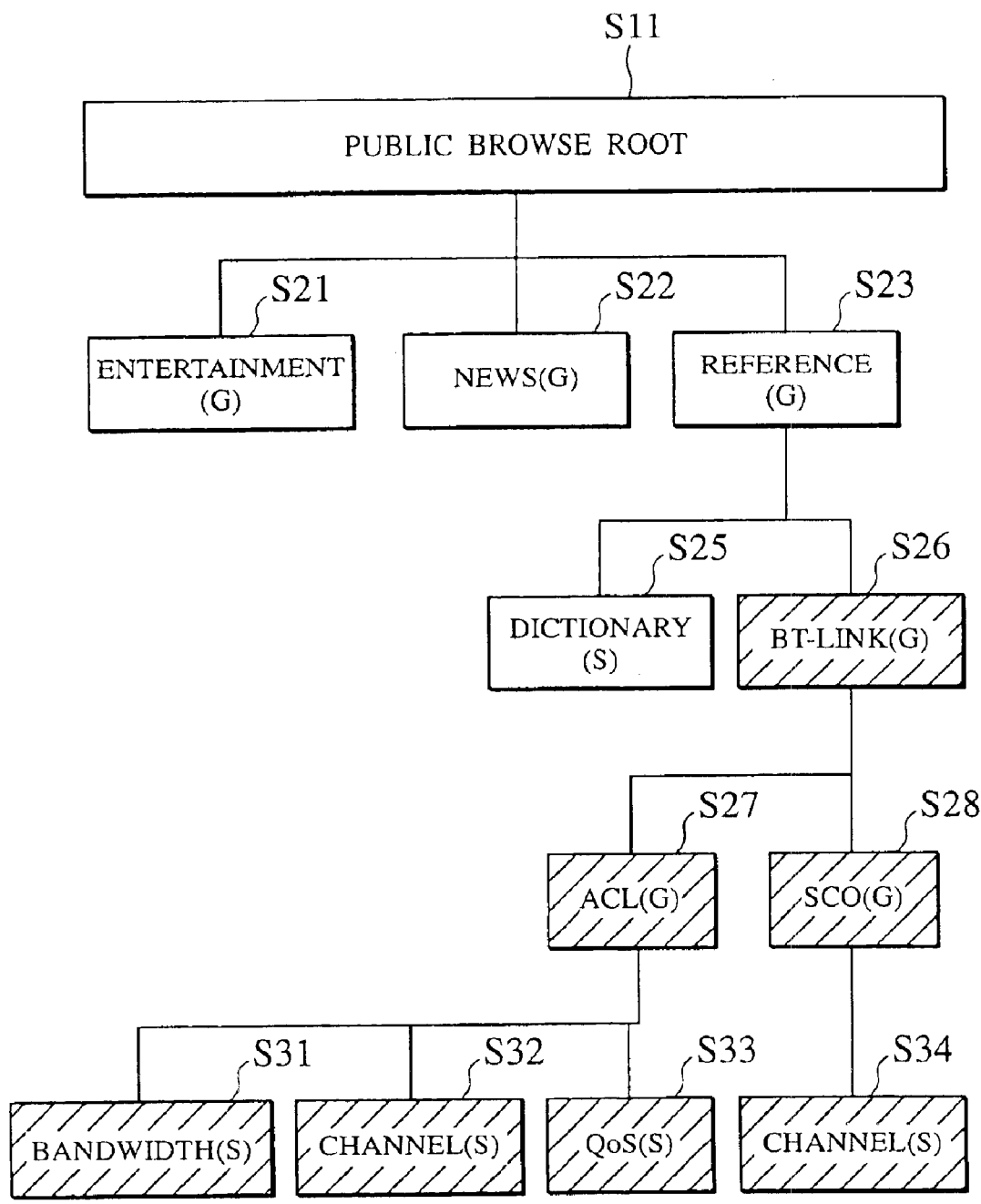
FIG. 4 is a drawing showing an example of means for holding wireless link condition information using SDP, in a wireless terminal in the first embodiment of the present invention.

FIG. 4 shows an example of Descriptor information held by the SDP protocol executed in the first embodiment.

As shown in FIG. 4, under a Public Browse Root (S11) that is the origin when searching for Descriptor information in the SDP Protocol, there is are service groups such as Entertainment (S21), News (S22), and Reference (S23) and the like. For example, under the Entertainment group (S21), there is coded types of stored new sources.

In the first embodiment, under the Reference group (S23), a BT-Link group (S26) is defined, in which information with regard to the wireless link (Bluetooth) stored. Under the BT-Link group there is an information group with regard to the ACL (S27) and an information group with regard to the SCO (S28). Under the information group with regard to the ACL link (S27), there is coded information such as the usable bandwidth on the ACL link (S31), information of the usable channel numbers (S32), and information with regard to the corresponding QOS (Quality of Service) (S33). Under the information group with regard to the SCO link (S28), there is information with regard to, for example, the number of usable SCO channels (S34). Additionally, although not shown in FIG. 4, in addition to information by the type of transfer, such as ACL or SCO, this Descriptor information can have coded in it as Bluetooth condition information other condition information such as Bluetooth version information or electrical power mode and hardware information.

By using a Descriptor such as described above, it is possible using the SDP protocol 26 to collect BT-Link information of a local BT terminal, or to read out BT-Link information of another BT terminal. Specifically, in the processing steps (3) and (7) of the processing sequence of FIG. 3, information under the information group (S27) with regard to the ACL link of the local BT terminal is collected, and at the processing steps (9) and (10), information of the information group (S27) with regard to the ACL link of the BT terminal 111 is read out.

Figure 5:
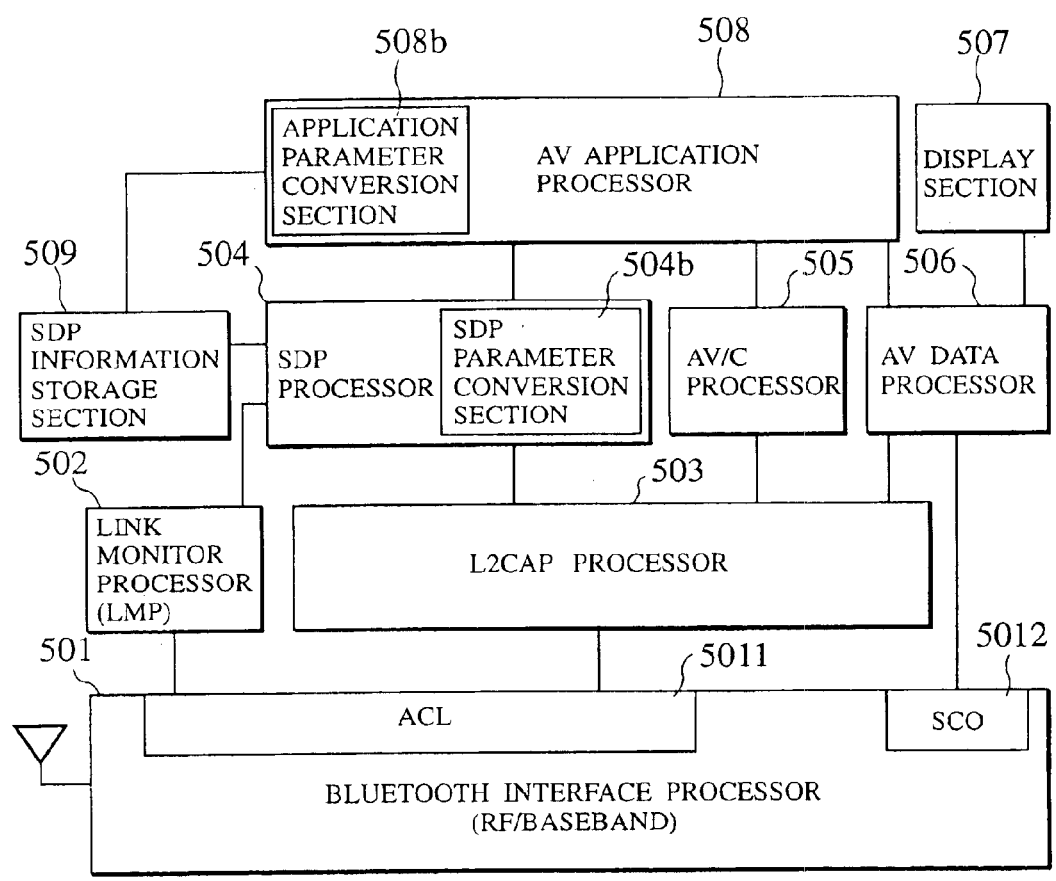
FIG. 5 is a block diagram showing an example of the internal configuration of a wireless terminal in the first embodiment of the present invention.

FIG. 5 shows an example of a block diagram of the internal configuration of a BT terminal 101 used in the first embodiment of the present invention.

The BT terminal 101 in the first embodiment is capable of wireless communication using Bluetooth, and has for this purpose a Bluetooth interface processor 501 that executes physical layer processing.

The Bluetooth interface processor 501 has two types of defined transfer modes, an ACL mode 5011 and an SCO mode 5012. As a data link layer function using the ACL mode 5011, there exists a L2CAP processor 503, and as a data link layer management function, there exists a link monitor processor (LMP) 502. This link monitor processor 502 monitors and collects link condition information of Bluetooth, and gives notification thereof to an SDP processor 504.

At the L2CAP processor 503, there resides an SDP processor 504 for accessing, notification, and response with respect to service information (including wireless link condition information) existing at the BT terminal 101, an AV/C processor 505 for execution of a control protocol for AV data transfer with the BT terminal 111, an AV data processor 506 for execution of AV data transfer with the BT terminal 111, and an SDP information storage section 509 for storage of wireless link condition information. Although in this case the AV data handled by the AV data processor 506 is basically data that is received by transfer via the L2CAP processor 503, it will be understood that the first embodiment is not restricted in this manner, and that there is the case in which audio data from the SCO mode 5012 that handles audio data used in a normal telephone is handled.

At this point, notification of information collected at the Link monitor 502 is made to the SDP processor 504, and link condition information of Bluetooth stored in the SDP information storage section 509 is read out by the AV application processor 508.

When this is done, the wireless link condition information collected at the Link monitor processor 502 is not limited to parameters codable as SDP information. Additionally, the parameters representing wireless link condition information coded in the SDL processor 504 are not necessarily parameter that can be read out by an upper AV application processor 508. Therefore, in the SDP processor 504 a function of performing processing to convert information collected at the link monitor processor 502 to a parameter that is readable by the SDP processor 504 is provided within the SDP processor 504 (this being executed in by the SDP parameter conversion section 504b in FIG. 5), and a function of performing processing to convert information coded within the SDP processor 504 to a parameter that is readable by an AV application processor 508 is provided within the AV application processor 508 (the application parameter conversion section 508b in FIG. 5).

Additionally, the AV application processor 508, based on this wireless link condition information, establishes the processing that the AV/C processor 505 and the AV data processor 506 should perform and gives notification of the same.

Specifically, the AV application processor 508, in response to this wireless link condition information, performs such AV application processing as determining whether or not data transfer is possible, changing the data transfer rate, and re-transmitting data, executing this processing while controlling the SDP processor 504, the AV/C processor 505, and the AV data processor 506. The BT terminal 101 has a display section 507 for displaying video data (or AV data) processed by the AV data processor 506. For example, the display section 507 can display a list of AV data (content) that can be transferred, and the user can be made to select AV data to be transferred from this list.

The BT terminal 111 that transfers AV data, in contrast to the BT terminal 101 that acts as a controller, can be provided with all functions, or can have the AV application processor 508 and display section 507 omitted.

According to the first embodiment of the present invention, in a wireless network in which the condition of a link varies dynamically, it is possible for an upper application to perform AV data transfer while consideration is given to the wireless link condition.

Second Embodiment

A second embodiment of a wireless network system according to the present invention is described below, with reference made to FIG. 6 to FIG. 9.

The second embodiment is another form of the first embodiment shown in FIG. 1, in which AV data transfer is performed between a BT terminal 101 and a BT terminal 111. In the second embodiment, similar to the case of the first embodiment, because the BT terminal 101 and the BT terminal 111 are connected by Bluetooth, a what transfer rate AV data at the BT terminal 111 can be transferred is established by the link type used in Bluetooth, and the degree of noise on Bluetooth.

In the second embodiment, a method of giving notice of the Bluetooth link condition information to an AV application is not that of using an SDP protocol as is done in the first embodiment, but rather that of giving notification by using an AV/C Protocol used by an AV application.

Figure 6:
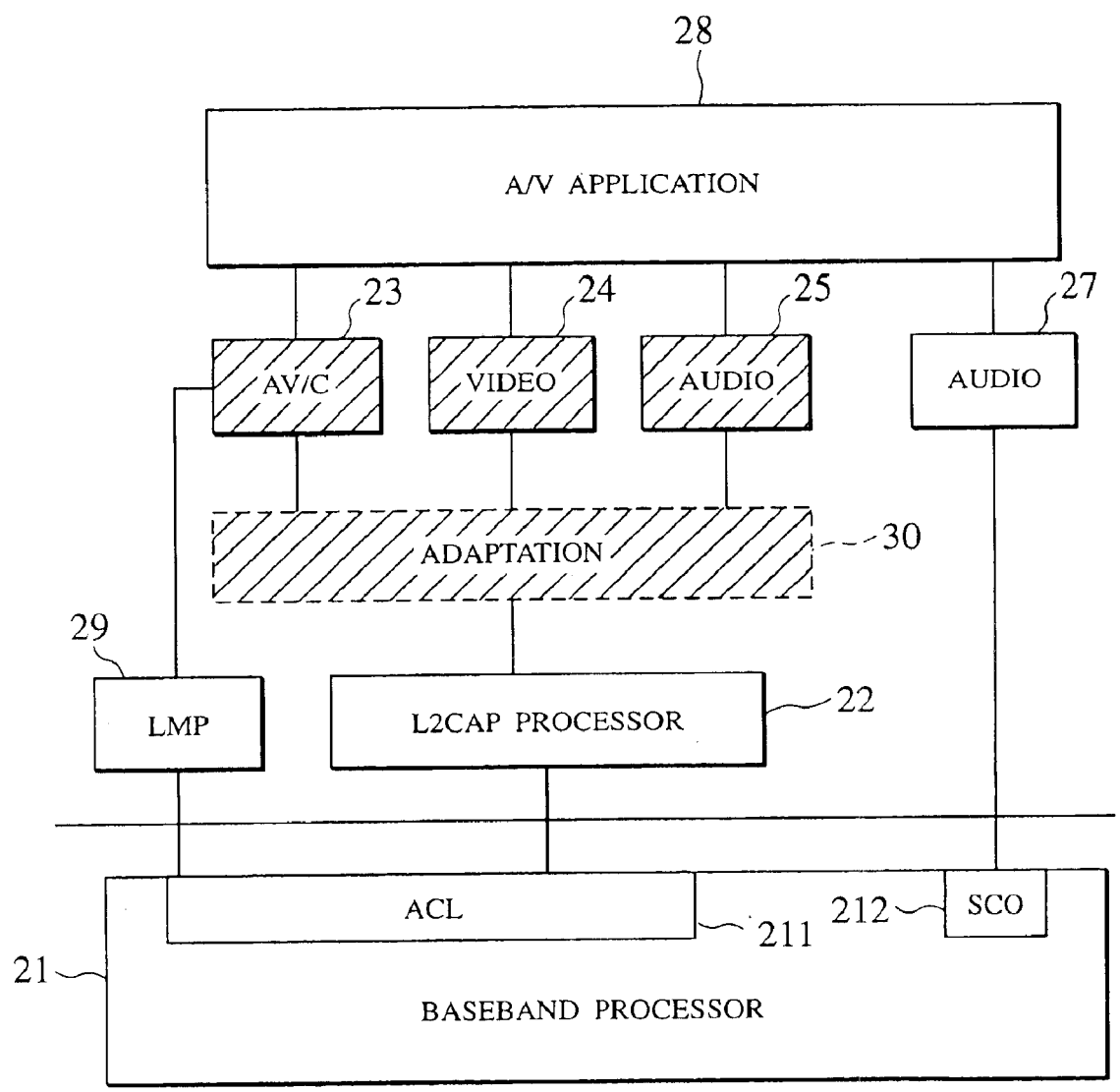
FIG. 6 is a drawing showing another example of a protocol stack within a wireless terminal according to a second embodiment of the present invention, for the case of performing AV data transfer using Bluetooth.

FIG. 6 shows an example of a protocol stacking BT terminal in the above case.

In FIG. 6, there is no SDP protocol processor 26 which in the first embodiment performs processing for passing wireless link condition information. In its place, there is an LMP (Link Management Protocol) processor 29 that using the ACL mode 211 of a Baseband processor 21, similar to the L2CAP processor 22. This LMP protocol processor 29 collects wireless link condition information. The collected wireless link condition information is converted to a format that can be interpreted by an AV/C Protocol processor 23 defined as a protocol at the L2CAP 22, notification thereof being made to the AV/C Protocol processor 23. In the second embodiment, therefore, when performing sending and receiving of AV data between BT terminals, an AV application 28 can collect wireless link condition information from the AV/C Protocol processor 23.

In the example described below, the notification of the wireless link condition information using the AV/C Protocol processor 23 is described for the case in which the method of using the Descriptor at the AV/C Protocol is that in which the wireless link condition information is appended to part of the Descriptor information. Other methods of giving notification of the wireless link condition information to an upper application using the AV/C Protocol that can be envisioned include the method of writing the wireless link condition information to response information to a command to collect SubUnit information defined as an AV/C Protocol command (SubUnit_Information command), and the method of defining a separate AV/C Protocol command for reading out and giving notification of a wireless link condition.

Figure 7:
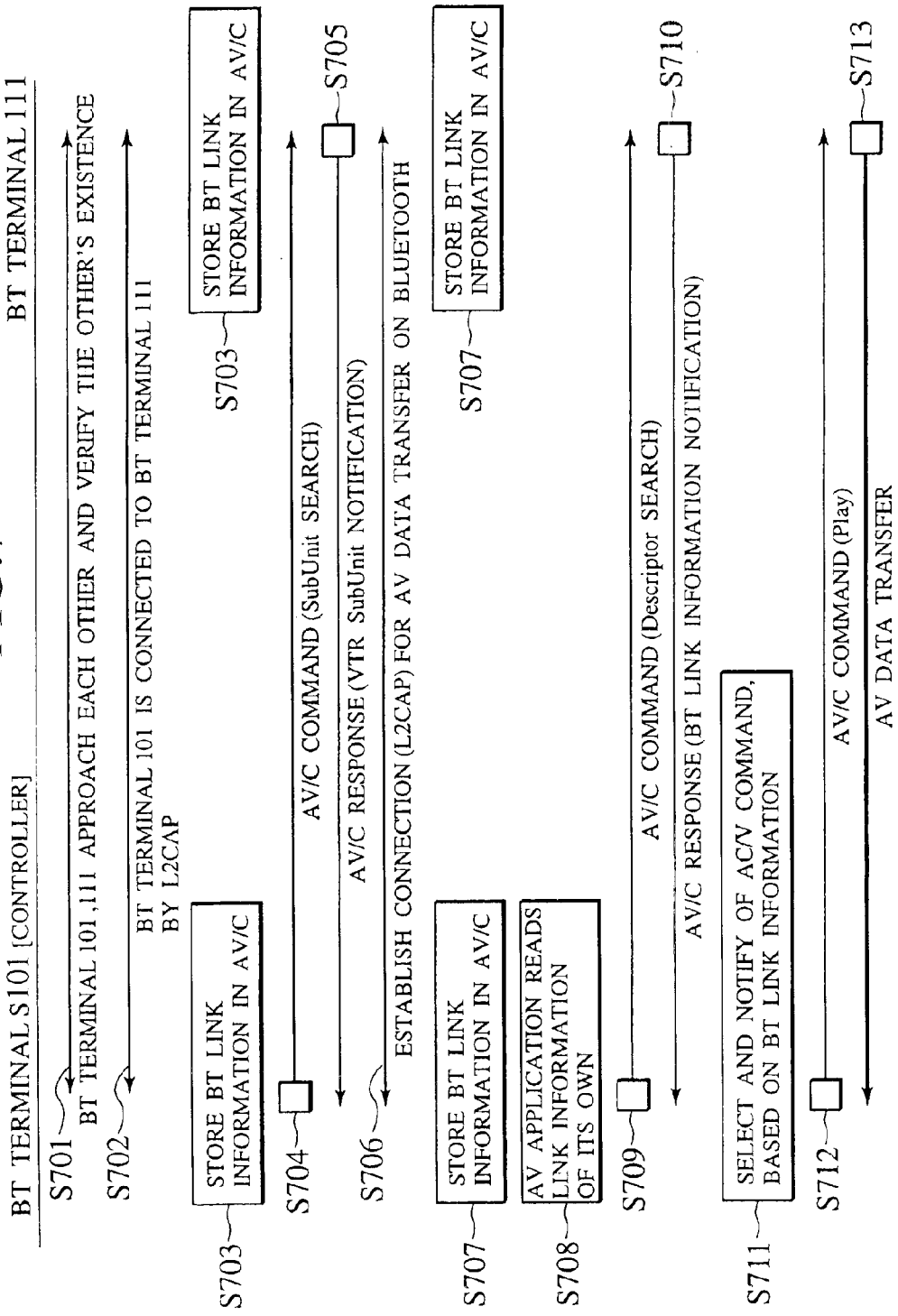
FIG. 7 is a drawing showing another example of a packet transfer processing sequence between wireless terminals in the second embodiment of the present invention.

FIG. 7 shows an example of the processing sequence in the second embodiment, wherein with the hardware configuration shown in FIG. 1, a BT terminal 101 reads out AV data (video data stored within the VTR_SubUnit 112 of the BT terminal 111) for viewing.

The actual steps of the processing sequence are as follows.

(1) BT terminal 101 and BT terminal 111 approach one another and each recognizes that it is in a region enabling communication with the other (processing performed by the Baseband processor 21) (step S701).

(2) A connection is set up between the BT terminal 101 and the BT terminal 111 for the purpose of transfer of an AV/C message therebetween (processing performed by the L2CAP processor 22) (step S702).

(3) The BT terminal 101 and the BT terminal 111 use a protocol (HCI) on the Bluetooth to collect wireless link condition information in which processing step (2) caused a change, and store the same within a Descriptor used in the AV/C Protocol (step S703). In this case, the SDP information (103, 113) in FIG. 1 is replaced by the Descriptor used in the AV/C Protocol.

(4) The BT terminal 101 uses the SubUnit_Info command of the AV/C Protocol to collect SubUnit information existing in the BT terminal 111. What is used for this is a logical connection on the L2CAP set at processing (2) (step S704).

(5) The BT terminal 111 makes notification of an AV/C response to the BT terminal 101 to the effect that the VTR_SubUnit 112 exists as a SubUnit within the local terminal device (step S705).

(6) The BT terminal 101 sets a logical connection on Bluetooth for the purpose of receiving AV data from the BT terminal 111 (processing performed by the L2CAP processor 21) (step S706).

(7) The BT terminal 101 and the BT terminal 111 use a protocol (HCI) on the Bluetooth to collect wireless link condition information in which processing (6) caused a change, and stores the same within a Descriptor used in the AV/C Protocol (step S707). In this case, the SDP information 103 and 113 shown in FIG. 1 is replaced by the Descriptor information in the AV/C Protocol.

(8) An AV application at the BT terminal 101 reads the Descriptor information in the AV/C Protocol of the local terminal device, and obtains link condition information in Bluetooth (step S708).

(9) The BT terminal 101, in order to obtain information with regard to the VTR_SubUnit 112 within the BT terminal 111, sends a Read_Descriptor command (AV/C Protocol command) to the BT terminal 11 for the purpose of reading the Descriptor in the AV/C Protocol (step S709). What is used at this point is the logical connection set at the processing (2).

(10) The BT terminal 111 gives notification of the Descriptor information in the AV/C Protocol of the VTR_SubUnit 112 of the local terminal device to the BT terminal 101 (step S701). When this is done, notification is also made of wireless link condition information (which can include, for example, content information such as the encoding method). The wireless link condition information for which notification is made is appended to the coding of the Descriptor information of AV/C to be stored in the AV/C information storage section 910 shown in FIG. 9. What is used in this notification is the logical connection on the L2CAP set at the processing (2).

(11) The BT terminal 101 reads the link condition information of the received Descriptor, and selects an AV/C command in accordance with these link conditions for the purpose of acquiring content (step S711). Also a selection is made of a transfer method (ACL or SCO) that is required by the AV data and capable of use by the Bluetooth. For example, it is possible to make selection of various processing details and methods, such as selection of AV data to be played and specification of rates, giving consideration to the wireless link condition. Additionally, it is possible for the above selection to be made by the intervention of a user. For example, a GUI can be used to present a list of AV data that can be transferred and viewed, in response to the wireless link condition information, the user being caused to select from this listed content the desired AV content.

(12) The BT terminal 101 transfers the above-noted selected AV/C command to the BT terminal 111 so as to specify AV data, after which it sends an AV data playback command (play command) to the BT terminal 111. What is used at this point is a logical connection on the L2CAP set at processing (2).

(13) The BT terminal 111 start the AV data transfer in response to the "play" command. What is used at this point is the logical connection on the L2CAP set at the processing (6).

By performing processing as described above, AV data transfer between wireless terminals can be performed efficiently, in accordance with the associated wireless link condition.

As described above, in addition to the method of reading the Descriptor to collect wireless link condition information on the AV/C protocol, there is the method of notation in the response information to the collection command (SubUnit_Info command) of the SubUnit information at processing (5). It can be envisioned that at processing (9), rather than sending a Read_Descriptor command, a command for the purpose of collecting wireless link condition information (for example, a Read_DataLinkInfo) is defined and then used.

The wireless link condition information about which notification is made at the processing (10) in the above-noted processing sequence, similar to the case of the first embodiment, can be envisioned as including such information as the type of transfer and condition of transfer possible on Bluetooth, Bluetooth version information, or electrical power mode information. At the processing (3) and (7) in the above-noted processing sequence, it is assumed that there is a case in which it is necessary to perform some type of Information conversion so as to adapt the collected wireless link condition information to the representation in the Descriptor of the AV/C Protocol.

At processing (10) of the above-noted processing sequence, although a selection is made of content to be received, in accordance with wireless link condition information (the content information being included in the received Descriptor information), a different method for adapting to the wireless link condition information from that of selecting content. For example, in the case in which the VTR_SubUnit 112 of the BT terminal 111 has a real-time encoder function, it can be envisioned that the encoding rate of the encoder is controlled in accordance with the wireless link condition information. In the case in which the VTR_SubUnit 112 has a plurality of encoding functions (for example, an MPEG2 encoding function and an MPEG4 encoding function), a method can also be envisioned in which a type of encoding function to be executed is selected in accordance with this wireless link condition information, and an encoding method capable of providing a rate that can be used on the wireless link is used to encode and sent AV data within the VTR_SubUnit 112.

Figure 8:
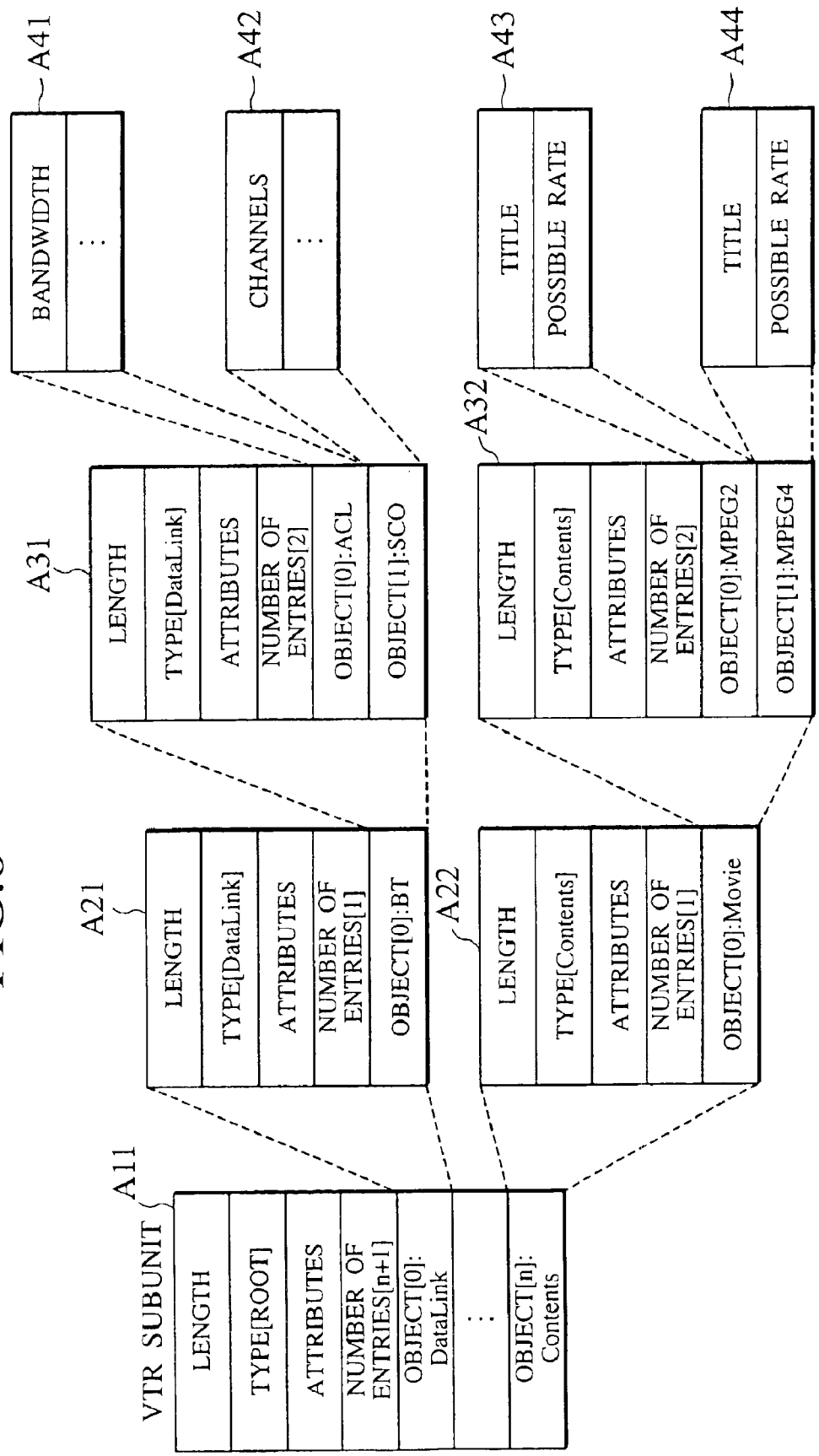
FIG. 8 is a drawing showing an example of a method for holding condition information of a wireless link using AC/V in the second embodiment of the present invention.

FIG. 8 shows an example of Descriptor information within an AC/V Protocol within a BT terminal 111 of the second embodiment.

FIG. 8 shows the case in which a Descriptor is defined in each SubUnit identifiable by the AV/C Protocol, the Descriptors for each SubUnit being represented hierarchally. In the example shown in FIG. 8, first a DataLink_Descriptor (A21) corresponding to a communication interface of the BT terminal 111 and a Contents_Descriptor (A22) corresponding to a stored movie or game are indicated as an Object group existing within a Root Descriptor (A11) of the VTR_SubUnit 112. As the Objects, the DataLink_Descriptor (A21) has the Bluetooth Object (A31) and the Contents_Descriptor (A22) has the Movie Object (A32). Each Object group (A31 and A32) has the specific parameters indicated such as the bandwidth at which transfer can be performed in the Bluetooth ACL mode (A41), information with regard, for example, to the number of channels that can be used in SCO (A42), the title of an MPEG2 encoded movie and the usable transfer speed (A43), and the title of an MPEG4 encoded movie and the usable transfer speed (A44). Although not shown in FIG. 8, in addition to information by the type of transfer, such as ACL or SCO, this Descriptor information can have coded in it as Bluetooth condition information other condition information such as Bluetooth version information or electrical power mode and BT terminal 111 hardware information.

Figure 9:
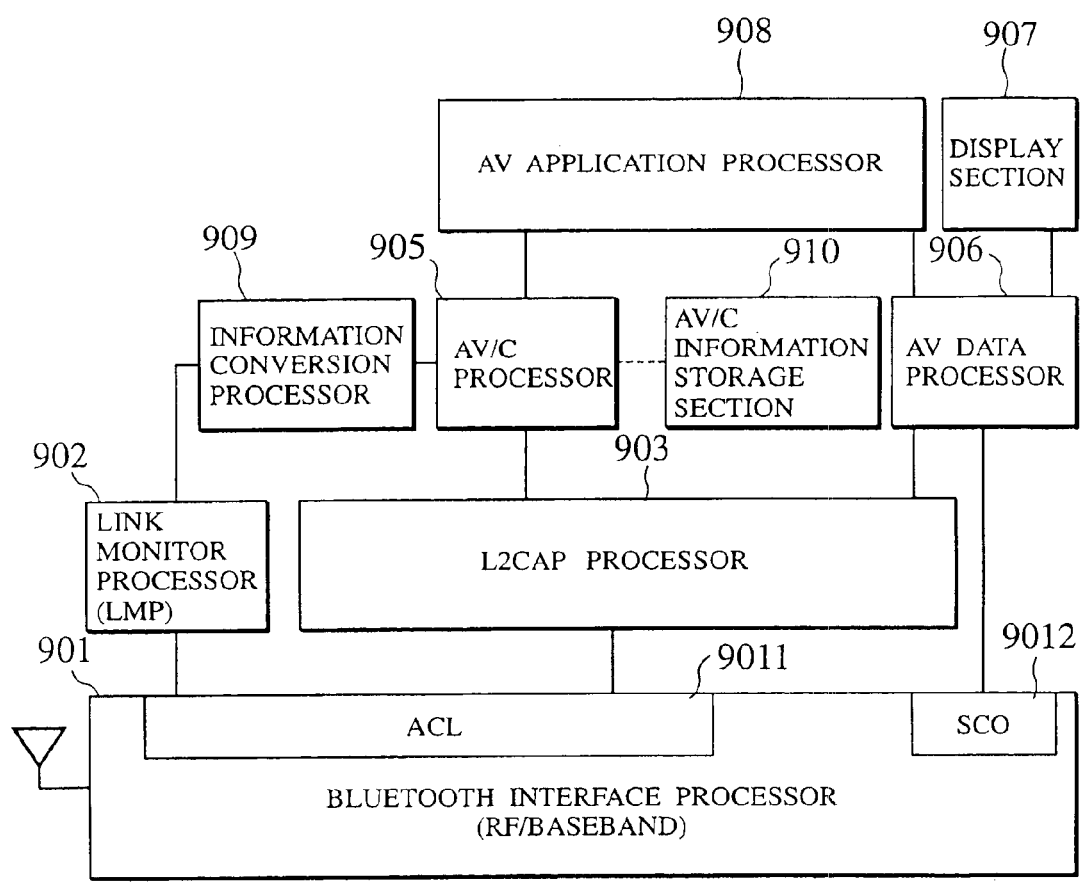
FIG. 9 is a block diagram showing another example of the internal configuration of a wireless terminal in the second embodiment of the present invention.

FIG. 9 shows an example of a block diagram of the internal configuration of a BT terminal 101 used in the second embodiment.

The BT terminal 101 of the second embodiment has a Bluetooth interface processor 901, for executing Bluetooth physical layer processing, an L2CAP processor 903 using an ACL mode 9011 defined in the Bluetooth interface processor 901, and a link monitor processor (LMP) 902. The link monitor processor 902 collects Bluetooth link condition information and makes notification of this wireless link condition information to an AV/C processor 905. At this point, the wireless link condition information collected at the Link monitor processor 902 is not necessarily information that is readable by the AV/C Protocol. For this reason, an information conversion processor 909 exists between the link monitor processor 902 and the AV/C processor 905 for the purpose of converting wireless link condition information collected at the link monitor processor 902 to a format that enables inclusion in the Descriptor information of AV/C protocol.

An AC/V processor 905 that executes the AV/C Protocol and an AV data processor 906 that performs transfer of the actual AV data using the ACL mode 9011 or the SCO mode 9012 remain at the L2CAP processor 903. The Bluetooth link condition information collected by the link monitor processor 902 and about which notification is made to the AV/C processor 905 is held and stored in an AC/V information storage section 910, and is read out by the AV application processor 908. The AV application processor 908, based on the read-out wireless link condition information, makes a determination and notification of the processing to be performed by the AV/C processor 905 and AV data processor 906. A display section 907 exists for the display of video data processed by the AV data processor 906.

According to the second embodiment of the present invention, in a wireless network in which the link condition varies dynamically, it is possible using the Descriptor of the AV/C Protocol to perform optimum AV data transfer, giving consideration to the wireless link condition information.

Third Embodiment

Next, a wireless network system according to a third embodiment of the present invention is described in detail below, with references made to FIG. 10 to FIG. 12. The third embodiment provides a function of performing optimized data transfer in a network configuration formed by the integration of a wireless network and a wired network, in which the wireless link condition information is considered.

Figure 10:
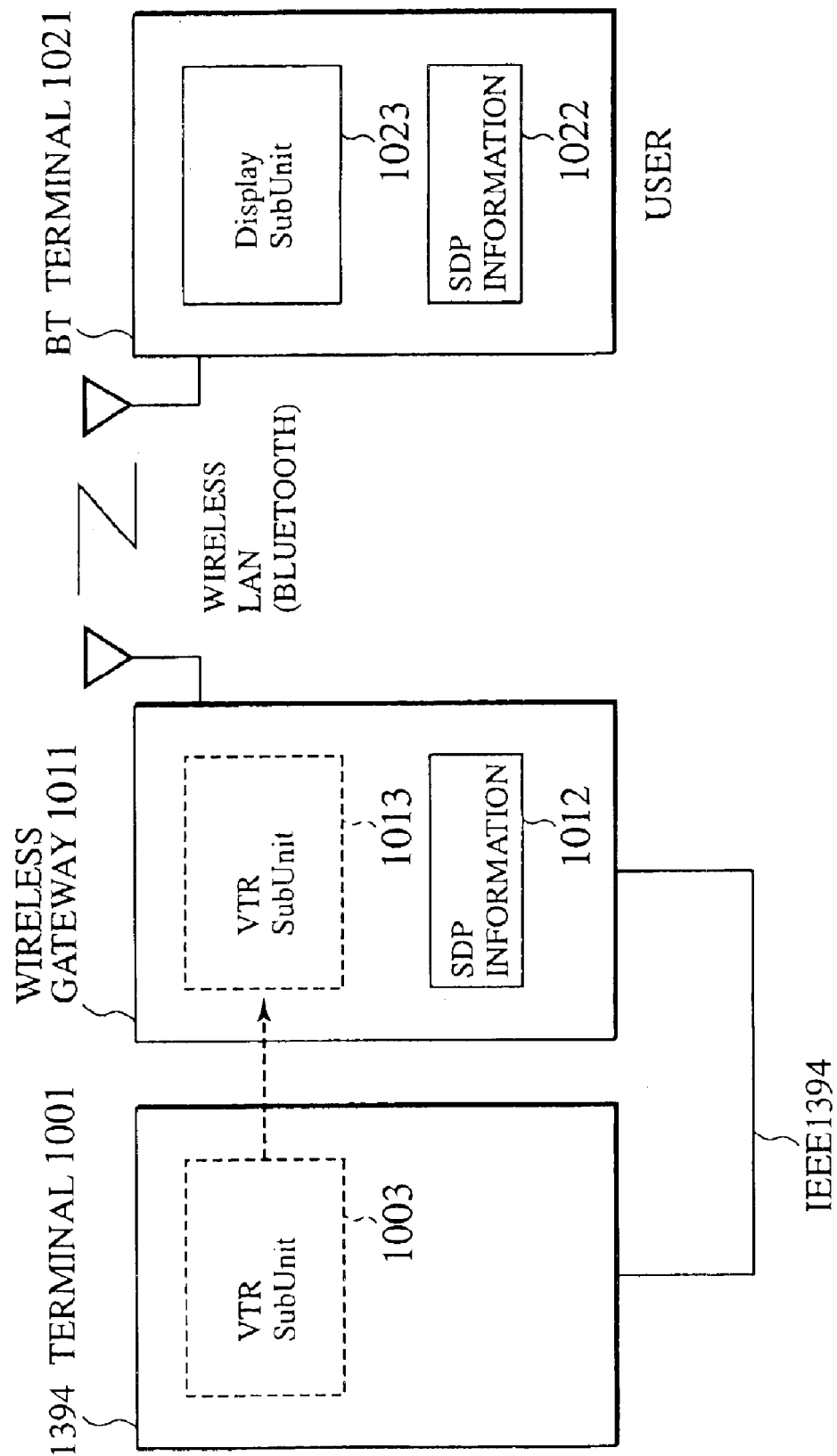
FIG. 10 is a drawing showing an example of a home-use AV network system using a gateway device according to a third embodiment of the present invention.

FIG. 10 shows an example of the configuration of a network formed by integrating a wireless LAN (Bluetooth) and IEEE 1394, for the case of performing AV data transfer.

In FIG. 10, a 1394 terminal 1001 on the IEEE 1394 bus and a BT terminal 1021 on the Bluetooth perform AV data transfer via a wireless gateway (GW) apparatus 1011 that connects the IEEE 1394 with Bluetooth.

In the third embodiment, the BT terminal 1021 has a display function and a Display_SubUnit 1023 in the AV/C Protocol, and holds the SDP information 1022 for Bluetooth.

The 1394 terminal 1001 has a VTR function, and holds the VTR_SubUnit 1003 in the AV/C Protocol.

Additionally, the wireless gateway apparatus 1011 that connects the IEEE 1394 and the Bluetooth provides a proxy function for the purpose of connecting the IEEE 1394 bus and the Bluetooth on the AV/C Protocol layer.

Specifically, the wireless gateway apparatus 1011 make the BT terminal 1021 recognize the VTR_SubUnit 1003, which actually exists within the 1394 terminal 1001, as if it existed within the local terminal device (in the gateway apparatus 1011). That is, the BT terminal 1021 recognizes the existence of the VTR_SubUnit 1003 within the wireless gateway apparatus 1011. By executing this proxy processing the BT terminal 1021, without being aware of the specific network configuration (the fact that the Bluetooth is actually connected to the IEEE 1394), just executes the AV/C Protocol defined on the Bluetooth, thereby enabling execution of the AV/C Protocol between it and the 1394 terminal 1001 on the IEEE 1394. The wireless gateway apparatus 1011 also holds SDP information 1012 on the Bluetooth.

In the third embodiment as well, similar to the case of the first embodiment, because the BT terminal 1021 and the wireless gateway 1011 are connected by a wireless LAN (Bluetooth), at what transfer speed it is possible to perform AV data transfer between the BT terminal 1021 and the 1394 terminal is dependent upon the link condition of the wireless LAN (Bluetooth). In the third embodiment, a protocol stack (refer to FIG. 2) similar to that of the first embodiment is used to execute an AV application on Bluetooth, the SDP information 1012 on the wireless gateway apparatus 1011 and the SDP information 1022 on the BT terminal 1021 being directly read from the AV application. Therefore, use of an API in the HCI protocol is assumed to be used as means for collecting Bluetooth link condition information in the third embodiment as well.

Figure 11:
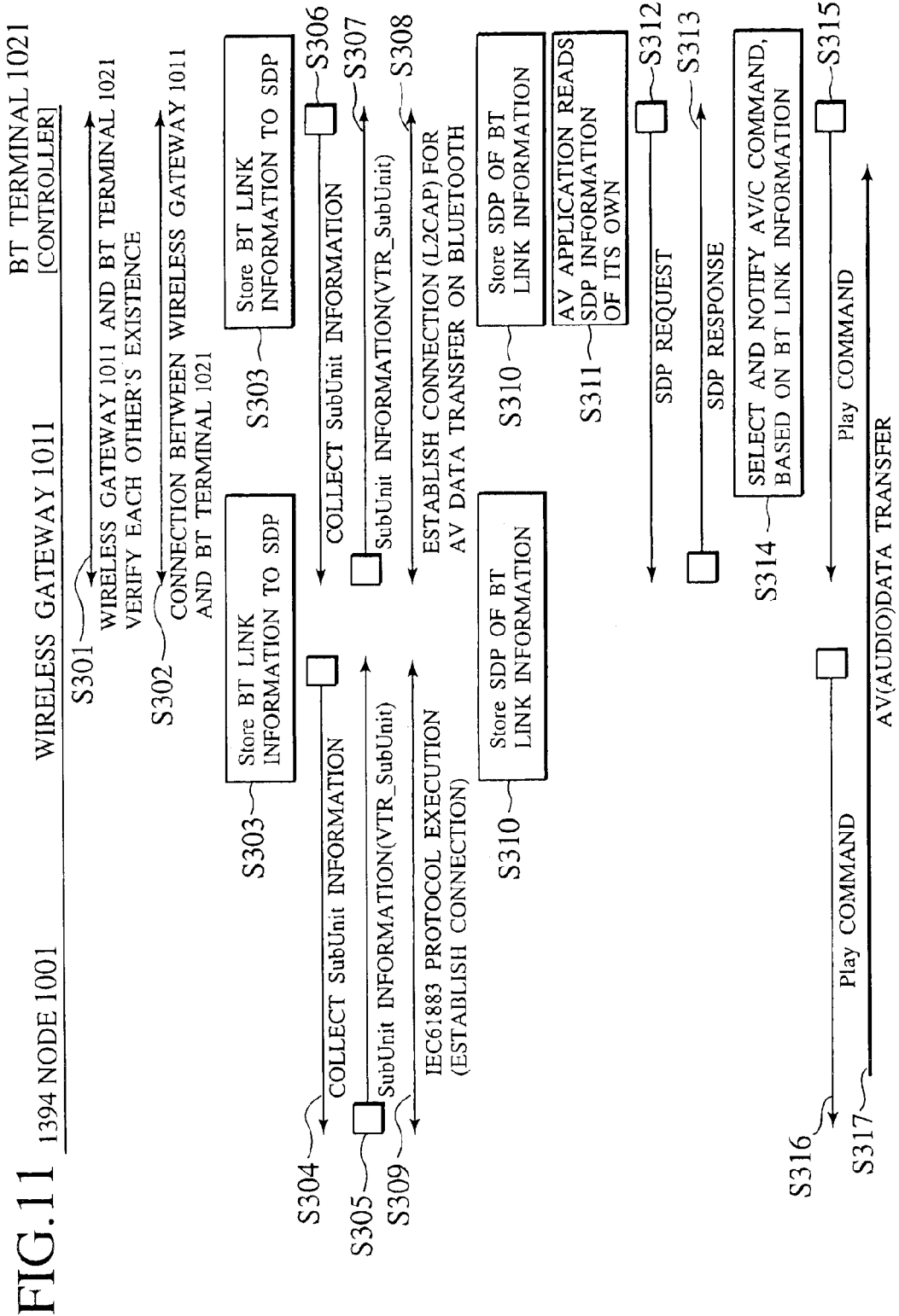
FIG. 11 is a drawing showing an example of a packet transfer processing sequence via the gateway device according to the third embodiment of the present invention.

FIG. 11 shows an example of the processing sequence in the third embodiment, for the case in which the BT terminal 1021, which serves as a controller, reads out AV data (data stored in the VTR_SubUnit 1003 of the 1394 terminal 1001) for viewing or the like. The actual processing steps are as follows.

(1) The BT terminal 1021 and wireless gateway apparatus 1011 approach one another and each recognizes that it is in a region enabling communication with the other (processing performed by the Baseband processor 21) (step S301).

(2) A logical connection is set up for the purpose of AV/C message transfer between the BT terminal 1021 and the wireless gateway apparatus 1011 (processing being performed by the L2CAP processor 22) (step S302).

(3) The BT terminal 1021 and the wireless gateway 1011 collect wireless link condition information (Bluetooth condition information) in which processing (2) cause as change, and store same within the SDP information storage sections 1012 and 1022 (Descriptors used by the SDP protocol), respectively (step S303).

(4) Before and after the processing (1) through (3), the wireless gateway 1011 uses a SubUnit_Info command of the AV/C Protocol to collect SubUnit information that exists in the 1394 terminal 1001 (step S304).

(5) The 1394 terminal 1001 makes notification to the wireless gateway 1011 of the fact that a VTR_SubUnit 1003 exists as a SubUnit in the local terminal device, in the form of an AV/C response (step S305).

(6) The BT terminal 1021 uses SubUnit_Info command of the AV/C Protocol to collect SubUnit information existing in the connected wireless gateway apparatus 1011 (step S306). What is used at this point is a logical connection on the L2CAP set by processing (2).

(7) The wireless gateway 1011 makes notification of the VTR_SubUnit 1003 as a SubUnit existing at the local terminal (actually VTR_SubUnit is a SubUnit existing in the 1394 terminal) to the BT terminal 1021 as a VTR_SubUnit 1013 within the local terminal device (step S307). What is used at this time is the logical connection on the L2CAP set at processing (2).

(8) The BT terminal 1021 sets up a logical connection on the L2CAP for the purpose of receiving AV data from the wireless gateway apparatus 1011 (step S308), processing being performed by the L2CAP processor 22.

(9) The wireless gateway apparatus 1011 establishes a connection on the IEEE 1394 bus for the purpose of receiving AV data from the 1394 terminal 1001 (step S309) (executes the IEC 61883 Protocol).

(10) The BT terminal 1021 and the wireless gateway apparatus 1011 each use the HCI Protocol to collect wireless link condition information (Bluetooth condition information) in which a change resulted from the above-noted processing (8), and store same into the SDP information 1012 and 1020 (Descriptors used in the SDP Protocol), respectively (step S310).

(11) An AV application at the BT terminal 1021 read the SDP Protocol Descriptor information of the local terminal device and obtains the Bluetooth link condition information (step S311).

(12) The AV application at the BT terminal 1021 sends an SDP_Request command to the wireless gateway 1011 for the purpose of reading the Descriptor information in the SDP Protocol of the wireless gateway apparatus 1011 (step S312).

(13) The wireless gateway apparatus 1011 gives notification to the BT terminal 1021 of the Descriptor information in the SDP Protocol at the local terminal device (step S313). The Descriptor information in the SDP Protocol at the local device of which notification is given is added to the coding of the Descriptor information of the SDP Protocol at the BT terminal 1021 and stored in the SDP information storage section (the same as the SDP information storage section 509 of FIG. 5).

(14) The BT terminal 1021 accesses the link condition information collected at processing (12) and selects an AV/C command to be sent to the VTR_SubUnit 1013 of the wireless gateway 1011 (step S314). It is possible, for example, to make selectable various processing details and processing methods, such as the selection of AV data to be played back and the rate, giving consideration to the condition of the wireless link. The above-noted selection can be made with the intervention of a user. For example, a GUI can be used to present a list of AV content that can be viewed, and the user can be made to select the desired AV content from the list.

(15) The BT terminal 1021 transfers to the wireless gateway 1011 an AV/C command (play command) for the purpose of playing back desired AV data (step S315). What is used at this time is a logical connection on the L2CAP set at processing (2).

(16) The wireless gateway apparatus 1011 transfers the received command (Play command) to the VTR_SubUnit 1003 that is the destination of this command within the 1394 terminal 1001 on the IEEE 1394 bus corresponding to the VTR_SubUnit 1013 (step S316).

(17) The VTR_SubUnit 1003 within the 1394 terminal 1001 starts the transfer of AV data (step S317). What is used at this time is a connection on the IEEE 1394 bus set at processing (9).

By performing processing in this manner, it is possible to efficiently execute the transfer of AV data across an IEEE 1394 bus and a wireless LAN (Bluetooth), in accordance with the condition of the wireless link, and in doing this, it is possible to use the same type of the Bluetooth link condition information and method of notification to the SDP Protocol of the collected link condition information as described with regard to the first embodiment.

Although it is not shown in the drawing, the Descriptor information in the SDP Protocol held in the wireless gateway 1011 of the third embodiment is the same as the Descriptor information (refer to FIG. 4) in the case of the first embodiment. However, because the wireless gateway apparatus 1011 does not only have a Bluetooth interface, but also has an IEEE 1394 interface, in the AV/C Protocol layer, link information of this IEEE 1394 bus is also stored and accessed.

Figure 12:
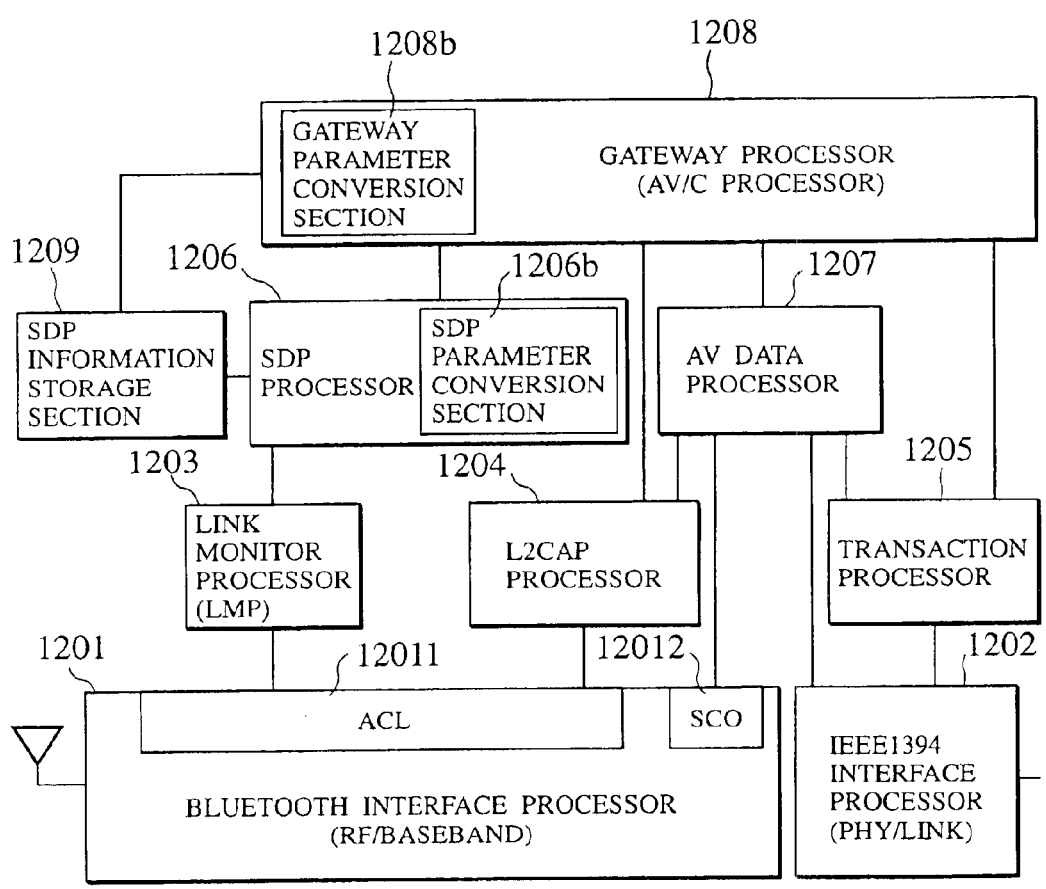
FIG. 12 is a block diagram showing an example of the internal configuration of a gateway device according to the third embodiment of the present invention.

FIG. 12 is shows an example of the block diagram of the internal configuration of a wireless gateway 1011 used in the third embodiment. In the third embodiment, the BT terminal 1021 on the wireless network can be implemented by the same type of wireless terminal device as in the first embodiment shown in FIG. 1 or the second embodiment shown in FIG. 9. Because there is no need to consider a network beyond the wireless gateway apparatus, the 1394 terminal 1001 on the wired network can be the same type of terminal device as used in the conventional art.

The wireless gateway apparatus 1011 of the third embodiment can perform both wireless communication by Bluetooth and wired communication by the IEEE 1394, and performs connection processing between these differing communication interfaces. It is also possible to perform proxy processing that enables execution of an AV/C Protocol that bridges across the IEEE 1394 bus and Bluetooth.

In order to perform this processing, within the wireless gateway 1011 in the third embodiment, there is a Bluetooth interface processor 1201 that executes the Bluetooth physical layer, and an IEEE 1394 interface processor 1202 that executes the physical layer and the link layer of the IEEE 1394.

In the Bluetooth interface processor 1201 there are two types of data transfer modes, an ACL mode 12011 and an SCO mod 12012. An L2CAP processor 1204 exists as a data link layer function using the ACL mode 12011 and a link monitor processor 1203 exists as a data link layer management function. The link monitor processor 1203 collects Bluetooth link condition information, and makes notification thereof to the SDP processor 1206. The Bluetooth link condition information collected at the link monitor processor 1203 and of which notification is made to the SDP processor 1206 is held and stored in the SDP information storage section 1209, and is read out by the gateway function processor (AV/C processor) 1208.

When this is done, the wireless link condition information collect at the link monitor processor 1203 is not necessarily a parameter that can be coded as SDP information. Additionally, parameters that represent the wireless link condition information coded in the SDP processor 1206 are not necessarily parameters that can be read by the upper gateway processor (AV/C processor) 1208. Therefore, in this case, for example, a function that performs processing (calculation processing) for conversion of information collected at the link monitor processor 1203 to parameters that can be understood by the SDP processor 1206 can be provided within the SDP processor 1206 (this being executed by the SDP conversion section 1206b shown in FIG. 12), and a function that performs conversion processing (calculation processing) for conversion of information coded within that SDP processor 1206 to parameters that can be understood by the gateway function processor 1208 can be provided within the gateway function processor 1208 (this being executed by the gateway conversion section 1208b shown in FIG. 12).

In the IEEE 1394 interface processor 1202, there exists a transaction processor 1205 for executing transaction processing for performing data transfer in the asynchronous mode on the IEEE 1394 bus.

At the AV data processor 1207 that executes AV data transfer between Bluetooth and the IEEE 1394 bus, protocol processing is performed, protocol processing with respect to data such as audio data form the SCO mode 12012 at the baseband processing 1201 of Bluetooth and AV data that is sent and received via the L2CAP processor 1204 from the ACL mode 12011. It is possible to use an isochronous channel or asynchronous packets on the IEEE 1394 bus to execute protocol processing of AV data, and to transfer AV data that bridges across Bluetooth and the IEEE 1394 bus.

Additionally, to enable execution of an AV/C Protocol that bridges across Bluetooth and the IEEE 1394 bus via the wireless gateway apparatus 1011, there is a gateway function processor 1208. At this gateway function processor 1208, in addition to execution of the AV/C Protocol proxy processing, processing such as determining whether or not data transfer is possible, establishing the transfer parameters, and controlling transfer is also performed, in accordance with the wireless link condition information.

According to the third embodiment of the present invention, by using the above-noted wireless gateway apparatus, it is possible to perform AV data transfer and data transfer control that bridges across a wireless LAN such as Bluetooth and the IEEE 1394. It is sufficient that a BT terminal on the wireless network (a wireless terminal) execute data transfer control with respect to the wireless gateway 1011, and it is not necessary to be aware of the IEEE 1394 protocol beyond the gateway. Without having to make a functional expansion of a conventional terminal device as used in a wired network, it is possible to achieve efficient AV data transfer via a gateway apparatus with respect to a wireless terminal on a wireless network.

Fourth Embodiment

A wireless network system according to the fourth embodiment of the present invention is described in detail below, with references being made to FIG. 13 to FIG. 16.

In the fourth embodiment, the difference with respect to the above embodiments is that it is assumed in this embodiment that a user accesses a 1394 terminal 1301 on the IEEE 1394 bus to view AV data within a wireless terminal 1321 existing on the wireless LAN. Similar to the case of the third embodiment, a wireless gateway apparatus 1311 makes a connection between the wireless LAN and the IEEE 1394 bus. In the fourth embodiment, an assumption made is that of the use of a LAN having a fall-back function (a function which changes the transfer rate in response to the wireless condition when the wireless LAN is started up) such as in IEEE 802.11 as the wireless LAN.

Figure 13:
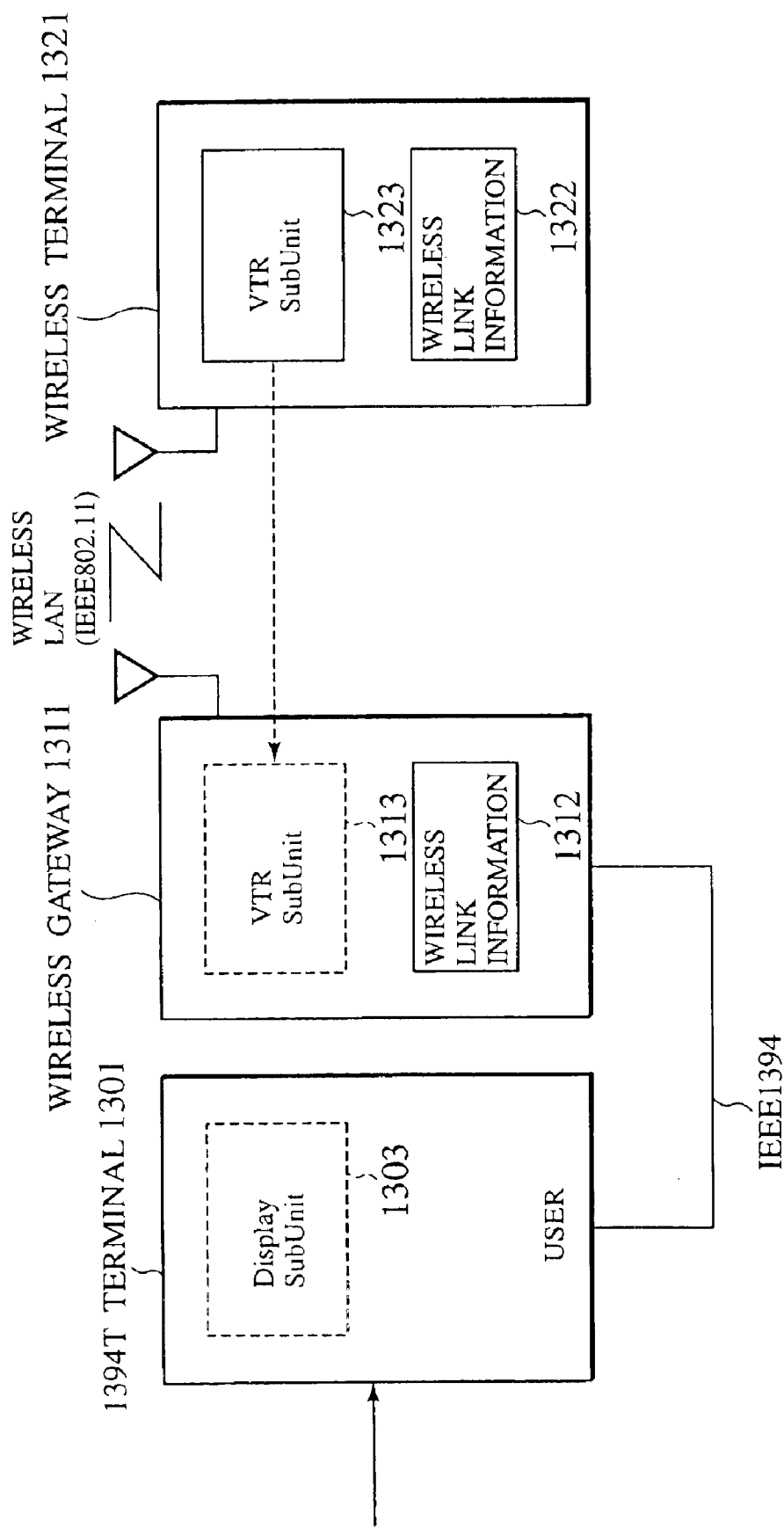
FIG. 13 is a drawing showing another example of a home-use wireless AV network system using a gateway device according to a fourth embodiment of the present invention.

FIG. 13 shows an example of the network configuration for the case in which AV data transfer is performed with a configuration formed by the integration of a wireless LAN (Bluetooth) with an IEEE 1394.

In the fourth embodiment, there is a Display_SubUnit 1303 within the 1394 terminal 1301, and a VTR_SubUnit 1323 within the wireless terminal 1321. The wireless gateway apparatus 1311 provides a proxy function for executing an AV/C Protocol that bridges across the IEEE 1394 and the wireless LAN (same function as that of wireless gateway in the third embodiment), and makes the 1394 terminal 1301 recognize the VTR_SubUnit 1313 corresponding to the VTR_SubUnit 1323 actually existing in the wireless terminal 1321 as the SubUnit existing in the local terminal device. Additionally, condition information for the wireless link, including the fall-back function information of the wireless LAN is stored in the link information 1312 and 1322 within the wireless gateway 1311 and wireless gateway 1321, respectively.

Figure 14:
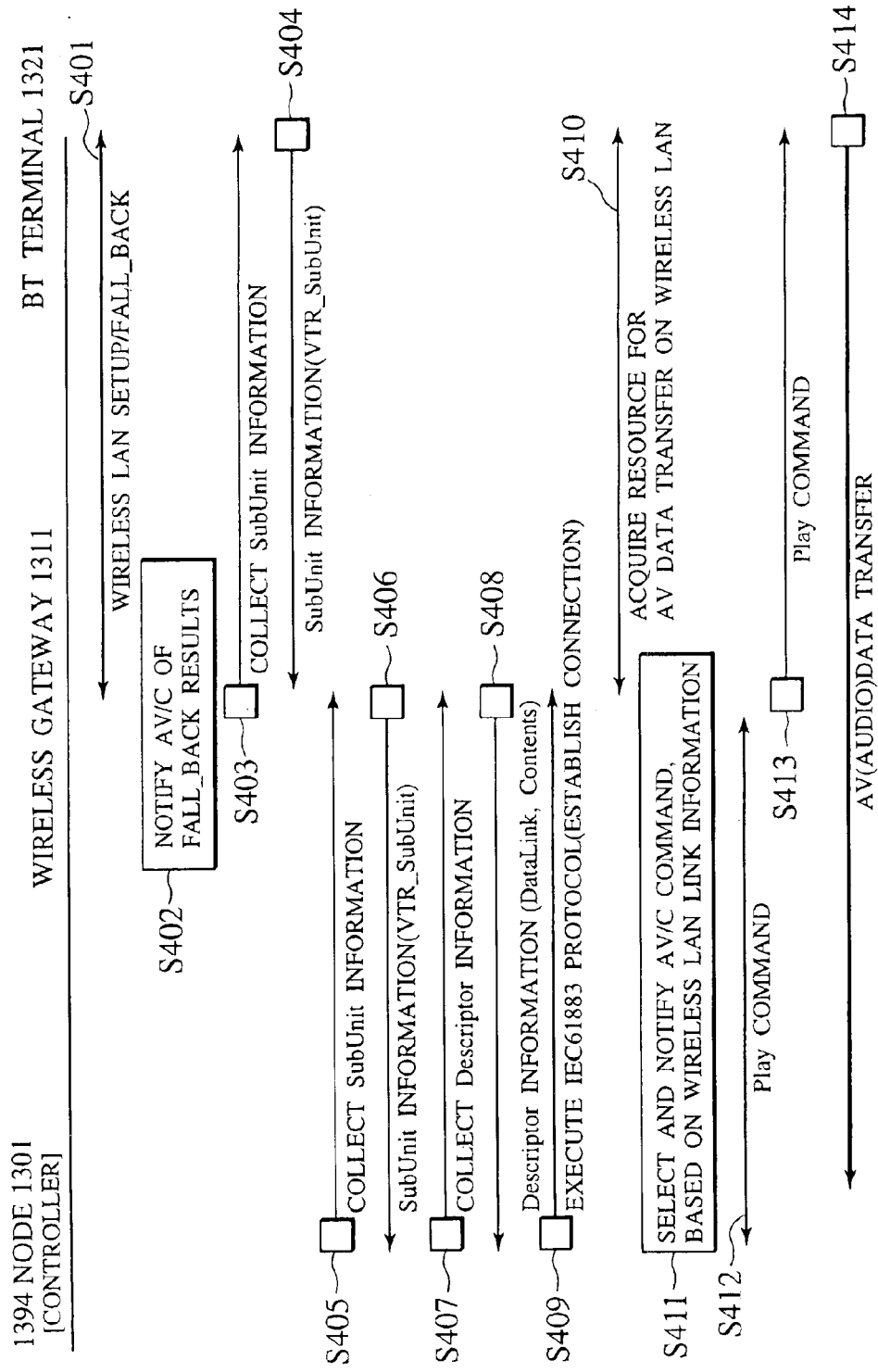
FIG. 14 is a drawing showing another example of a packet transfer processing sequence via a gateway device according to the fourth embodiment of the present invention.

In the fourth embodiment, as shown in FIG. 14, the same type of protocol stack as in the case of the second embodiment (refer to FIG. 6) is used execute an AV application on the wireless LAN. However, the Bluetooth physical layer part and the L2CAP processor each correspond to the physical layer part and the MAC layer part of the IEEE 802.11 wireless LAN, respectively. On the IEEE 802.11 wireless LAN as well, a protocol that collects wireless link condition information similar to LMP is separately defined.

Figure 15:
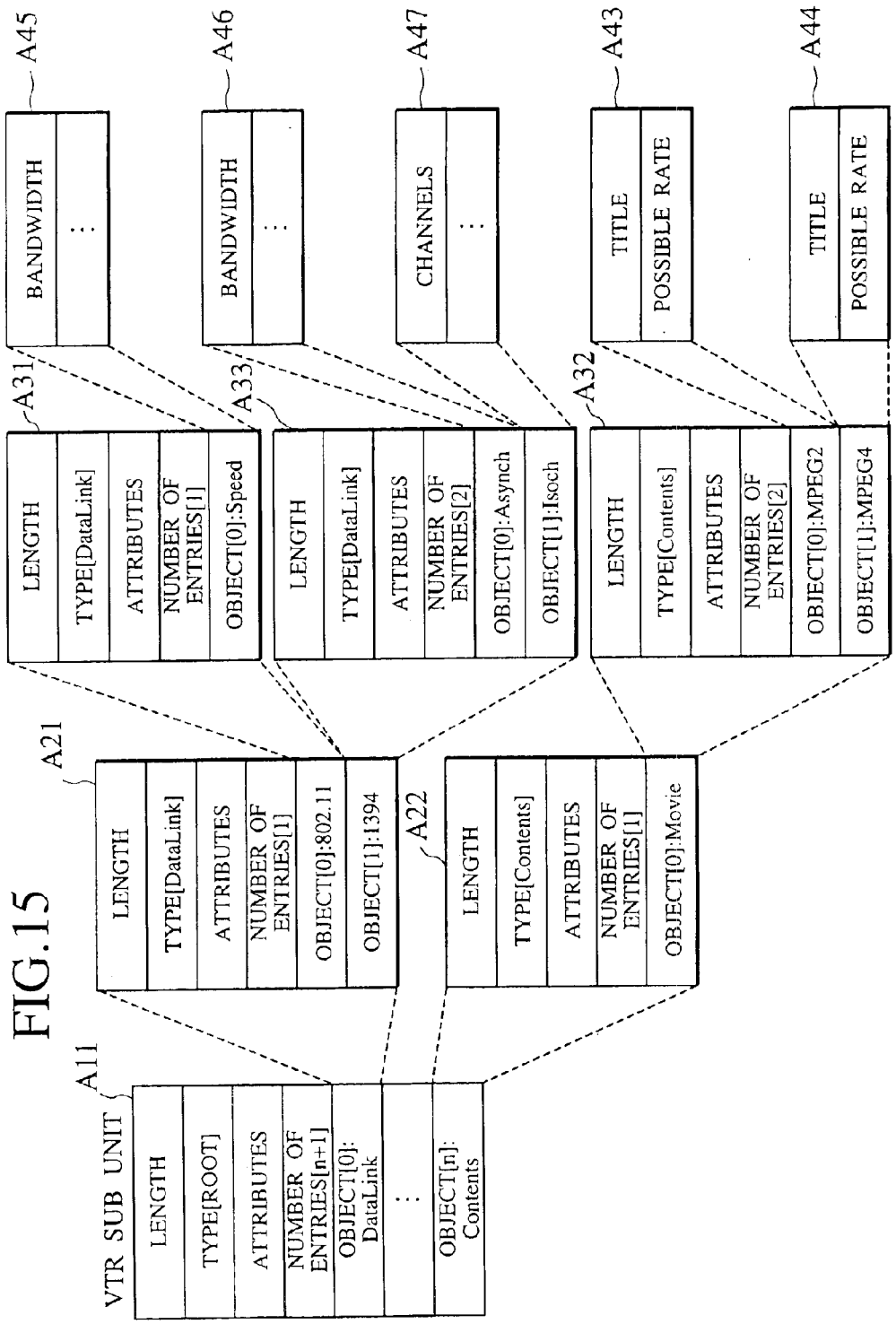
FIG. 15 is a drawing showing an example of a method for holding wireless link information using AV/C in a gateway device according to the fourth embodiment of the present invention.

FIG. 15 shows an example of the processing sequence for the case in which, in the fourth embodiment, AV data (data stored within the VTR_SubUnit 1323 of the wireless terminal 1321) is read out from 1394 terminal 1301 and viewed. The actual processing steps are as follows.

(1) The wireless LAN is started, and a modulation system is established so as to achieve a transfer rate commensurate with the condition between the wireless gateway 1311 and the wireless terminal 1321 (step S401).

(2) The wireless gateway apparatus 1311, as a result of fall-back, makes notification of the selected transfer rate and the like to the AV/C Protocol (step S402).

(3) The wireless gateway apparatus 1311, using a SubUnit_Info command of the AV/C Protocol, collects SubUnit information existing in the wireless terminal 1321 (step S403).

(4) The wireless terminal 1321 makes notification to the wireless gateway apparatus 1311 of the AV/C response, to the effect that the a VTR_SubUnit 1323 exists within the local terminal device, in the form of AV/C response (step S404).

(5) The 1394 terminal 1301, for example, uses the SubUnit_Info command of the AV/C Protocol to collect SubUnit information existing at the wireless gateway apparatus 1311 (step S405).

(6) The wireless gateway apparatus 1311 makes notification to the 1394 terminal 1301 of the VTR_SubUnit 1323 actually existing within the wireless terminal 1321 as a SubUnit existing within the local terminal (as the VTR_SubUnit 1311 existing within the local terminal) (step S406).

(7) The 1394 terminal 1301, in order to obtain information with regard to the VTR_SubUnit 1313 within the wireless gateway apparatus 1311, sends a Read_Descriptor command for reading the associated Descriptor (step S407).

(8) The wireless gateway apparatus 1311 makes notification to the 1394 terminal 1301 of the Descriptor information of the VTR_SubUnit within the local terminal (step S408). At this time, the fall-back information as well as the content information is notified to the wireless gateway apparatus 1301.

(9) The 1394 terminal 1301 establishes a connection on the IEEE 1394 bus in order to received AV data from the wireless gateway apparatus 1311 (and for this purpose executes the IEC 61883 Protocol) (step S409).

(10) The wireless gateway apparatus 1311 establishes a communication resource on the wireless LAN for the purpose of receiving AV data from the wireless terminal 1321 (operation in the PCF mode) (step S410).

(11) The 1394 terminal 1301, accessing Descriptor information that received at processing (8), selects an AV/C command to be sent to the VTR_SubUnit 1303 of the wireless gateway apparatus 1311 (step S411). Furthermore, immediately before the operation of selecting this AV/C command it is possible to perform the processing of (7) and (8) again with the wireless gateway apparatus, and further for the wireless gateway apparatus 1311 to request notification of Descriptor information from the BT terminal 1321, so as to obtain the wireless link condition and content information when transmitting data. In the selection of this AV/C command, it is possible to perform selection of the AV data to be played and specification of the rate. Additionally, for example, it is possible to make settings of various processing details and methods, such as the selection of AV data to be played and the transfer rate selectable. It further possible to make the above-noted selections by intervention of a user. For example, a GUI can be used present a list of AV content that can be transferred and viewed, in accordance with the wireless link condition information, and the user being caused to select from this listed content the desired AV content.

(12) The 1394 terminal 1301 sends an AV/C command (play command), for the purpose of playing back the desired AV data, to the wireless gateway apparatus 1311 (step S412).

(13) The wireless gateway apparatus 1311 sends the received command (play command) to the VTR_SubUnit 1323 that is the destination of this command within the wireless terminal 1321 on the wireless LAN corresponding to the VTR_SubUnit 1313 (step S413).

(14) The VTR_SubUnit 1323 within the wireless terminal 1321 starts AV data transfer with respect to the 1394 terminal 1301 (step S414).

By performing the above processing, it is possible to perform highly efficient AV data transfer that bridges across the IEEE 1394 and a wireless LAN (IEEE 802.11), responsive to the condition of the wireless link therebetween.

FIG. 15 is a drawing showing an example of the Descriptor information within the wireless gateway apparatus 1311 of the fourth embodiment.

The Descriptor information of the fourth embodiment as well, similar to the case of the second embodiment, indicates the case in which the Descriptor is defined for each SubUnit identifiable in the AV/C Protocol.

In the example shown in FIG. 15, the object group existing within the Root Descriptor (A11) of the VTR_SubUnit 1313 shows the DataLink_Descriptor (A21) corresponding to the communication interface of the wireless gateway apparatus 1311 and the Contents_Descriptor (A22) corresponding to a stored video or game or the like. The individual objects that exist are an object (A31) corresponding to the IEEE 802.11 in the DataLink_Descriptor (A21) and a movie object (A32) in the Contents_Descriptor (A22). Each of the object groups (A31, A32, and A33) has specific parameters such as the transfer rate after fall-back on the IEEE 802.11 (A45), the usable bandwidth in the asynchronous mode on the IEEE 1394 (A46), the number of channels set for the isochronous mode (A47), the title of an MPEG2 encoded movie and the usable transfer rate (A43), and the title of an MPEG4 encoded movie and the usable transfer rate (A44). Although it is not shown in FIG. 15, this Descriptor information can have coded in it condition information such as the type and version of the installed protocol, the sending electrical power mode, and hardware information of the wireless terminal 1321.

Figure 16:
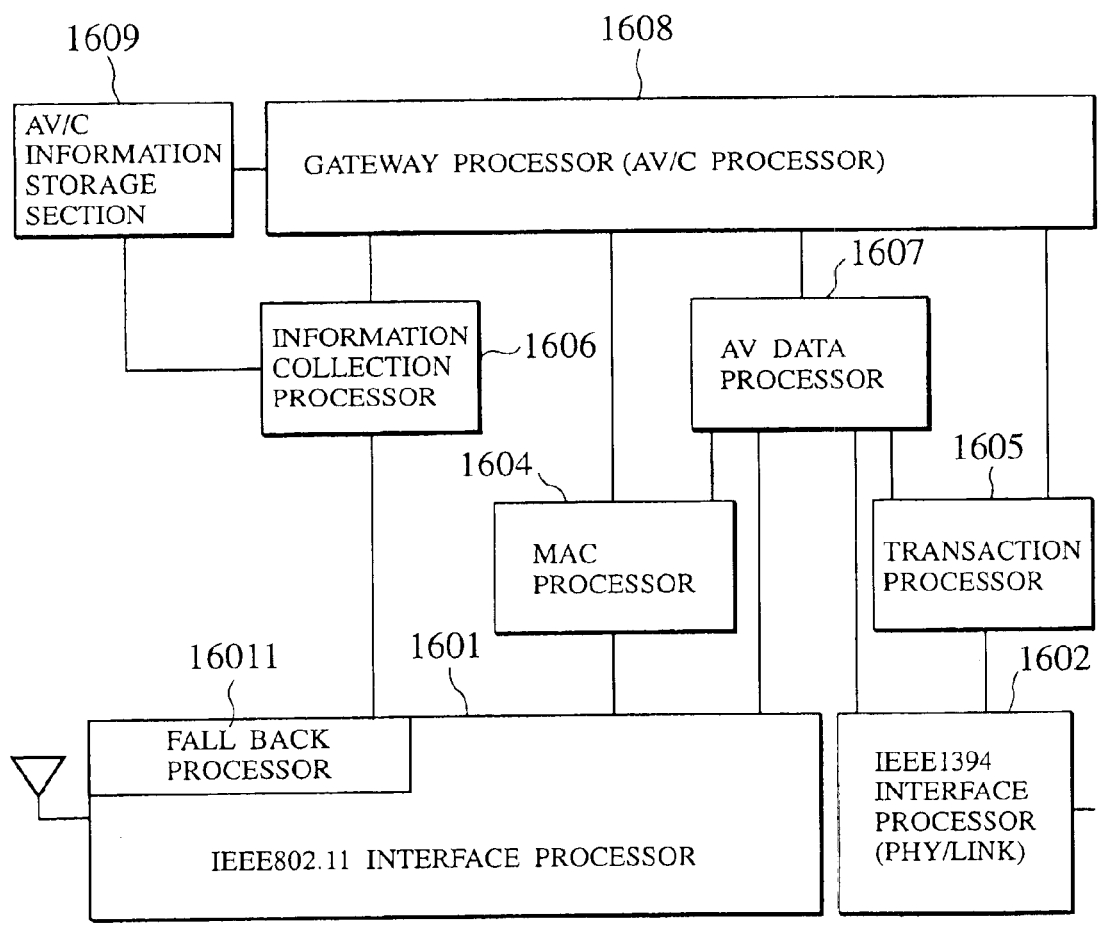
FIG. 16 is a drawing showing another example of the internal configuration of a gateway device according to the fourth embodiment of the present invention.

FIG. 16 is an example of a block diagram of the internal configuration of the wireless gateway apparatus 1311 used in the fourth embodiment.

The wireless gateway apparatus 1311 of the fourth embodiment can perform both wireless communication using the IEEE 802.11 and wired communication using IEEE 1394, and executes connection processing between these differing interfaces. Proxy processing to enable execution of the AV/C Protocol that bridges across the IEEE 1394 bus and the IEEE 802.11 is also performed in the wireless gateway apparatus 1311.

In order to perform this processing, the wireless gateway apparatus 1311 of the fourth embodiment comprises an IEEE 802.11 interface processor 1601, which executes IEEE 802.11 wireless LAN physical layer processing, and an IEEE 1394 interface processor 1602, which executes IEEE 1394 bus physical layer processing and link layer processing.

Within the IEEE 802.11 interface processor 1601 there exists a fall-back processor 16011, which executes fall-back processing at the time of wireless LAN startup, and this fall-back processor 16011 is connected to an information collection processor 1606 that collects transfer rate information resulting from the fall-back processing and send the collected information to an AV/C information storage section 1609 which stores the wireless link condition information.

The IEEE 1394 interface processor 1602 is connected to a transaction processor 1605, which executes transaction processing for performing data transfer in the asynchronous mode on the IEEE 1394 bus.

There is an AV data processor 1607, which executes AV data transfer between the MAC processor 1604 executing MAC protocol processing of the IEEE 802.11 or IEEE 802.11 wireless LAN and the IEEE 1394 bus, this performing processing of sending and receiving of AV data from the IEEE 802.11 or the IEEE 1394.

Additionally, there is a gateway function processor 1608 for the purpose of enabling execution of the AV/C Protocol bridging across the IEEE 802.11 wireless LAN and the IEEE 1394, via the wireless gateway apparatus 1311. At this gateway function processor 1608, in addition to execution of AV/C Protocol proxy processing and the like, in accordance with wireless link condition information, control is executed of whether or not transfer is possible, the transfer parameters, and AV data transfer.

According to the fourth embodiment, by using the above-described wireless gateway apparatus, it is possible to perform AV data transfer and transfer control thereof that bridges across a wireless LAN such as the IEEE 802.11 and the IEEE 1394 bus.

In the foregoing embodiments, it is possible to have a terminal and gateway apparatus that acquire the topology information and data link information and the like for AV data transfer, that is, wireless link condition information, by the local device only, and alternatively possible either to have this acquisition performed by other (remote) devices only, or by both the local device and other devices. The AV application used as an example of an upper application can execute bi-directional data transfer.

In the foregoing embodiments, although the descriptions were for the case in which an upper application at a data receiving side performed selection of AV processing based on notified Information, it is alternatively possible for the upper application at a data sending side to perform selection of processing based on notified information.

The present invention can be applied to a home network and further to various networks in an office or other environment.

The present invention related to an apparatus can also be implemented as a method, and a method according to the present invention can be implemented as an apparatus.

The present invention as it relates to a method or apparatus can further be implemented as a computer-readable recording medium, into which is stored a program for the purpose of execution by a computer the procedures corresponding to the present invention (or for the purpose of having a computer function as a means corresponding to the present invention, or further for the purpose of implementing on a computer a function corresponding to the present invention).

All or part of the above-noted functions can be implemented as hardware, in the form of a personal computer or a PDA (personal digital assistant), an AV equipment, or a communication device such as an access point and a home router, or as software executed on this type of hardware.

The above-described embodiments can be implemented as a computer-readable recording medium, into which is stored a program for the purpose of execution by a computer of a prescribed means (or for the purpose of having a computer function as the prescribed means, or further for the purpose of implementing on a computer a prescribed means). This recording medium can be loaded into a CPU of a computer and executed, thereby achieving the functions of the above-described embodiments.

In summary, according to the present invention, it is possible even in an environment formed by a connection between a wired network and a wireless network, such as between a wireless network environment exhibiting network condition variations and an IEEE 1394 bus, to perform highly efficient data transfer, in accordance with the link condition in the wireless network.

It is to be noted that, besides the embodiments described above, many modifications and variations of the above embodiments may be made without departing from the novel and advantageous features of the present invention. Accordingly, all such modifications and variations are intended to be included within the scope of the appended claims.

What is claimed is:

1. A terminal device for control of data between communicating entities on a network via a wireless link, comprising:
   an interface section for performing sending and receiving of packets with a remote communicating entity;
   a link setting section for setting a link for control and for data transfer with the remote communicating entity;
   a wireless link information acquisition section for acquiring wireless link information indicating the condition of a wireless link between said terminal device the remote communicating entity in the network at the time of setting the link, and for updating the wireless link information acquired at the time of setting the link by the current dynamically acquired wireless link information, the wireless link information including at least transmittable bandwidth information;
   a wireless link information storage section for storing the acquired or updated wireless link information as Descriptor information referable by the remote communicating entity; and
   an application section for, based on the wireless link information stored in the wireless link information storage section, determining whether or not data can be transferred and, if data transfer is possible, changing a transmission rate for transfer of data with the remote communicating entity, in accordance with the wireless link information.

2. The terminal device according to claim 1, wherein the wireless link information stored in the wireless link information storage section includes wireless link information with regard to said terminal device and wireless link information with regard to the remote communicating entity.

3. The terminal device according to claim 2, wherein the wireless link information acquisition section includes:
 a remote wireless link information requesting section for requesting notification of wireless link information with regard to the remote communicating entity that the remote communicating entity has, at the time of startup by the application section; and
 a remote wireless link information receiving section for receiving wireless link information of the remote communication entity, notification of which is made from the remote communication entity.

4. The terminal device according to claim 1, further comprising:
 a wireless link information updating section for changing wireless link information stored in the wireless link information storage section to a format interpretable by the application section and for passing the wireless link information to the application section.

5. The terminal device according to claim 1, wherein the wireless link information storage section stores wireless link information as information related to a constituent element of said terminal device.

6. The terminal device according to claim 5, wherein
 a SubUnit defined in the AV/C Protocol, upper layer protocol of the IEEE 1394, is used as the constituent element.

7. The terminal device according to claim 1, further comprising:
 a wireless link monitoring section for monitoring the condition of a wireless link in the network, for outputting wireless link information acquired by the monitoring to the wireless link information acquisition section.

8. The terminal device according to claim 1, further comprising:
 a local wireless link information sending section for sending wireless link information of said terminal device to the remote communicating entity, in response to a request from the remote communicating entity.

9. The terminal device according to claim 1, further comprising:
 a user interface section for, based on wireless link information stored in the wireless link information storage section, providing to a user a list of data candidates for transfer, and waiting for input from the user of data selected from the list.

10. The terminal device according to claim 1, wherein the wireless link information includes at least one of a packet discard rate, a usable bandwidth, a number of usable channels, a usable transfer rate, or observable information on which these are based.

11. The terminal device according to claim 1, wherein the transfer parameter is at least one of an AV/C command or content data to be transferred.

12. A terminal device for transfer of data between communicating entities over a network via a wireless link, comprising:
 an interface section for performing sending and receiving of packets with a remote communicating entity, and
 a link setting section for setting a link for control and for data transfer with the remote communicating entity;
 a wireless link information acquisition section for acquiring wireless link information indicating a condition of a wireless link between a local terminal device and the remote communicating entity in the network at the time of setting the link, and for updating the wireless link information acquired at the time of setting the link by the current dynamically acquired wireless link information, the wireless link information including at least transmittable bandwidth information;
 a wireless link information storage section for storing the acquired or updated wireless link information as Descriptor information referable by the remote communicating entity; and
 a local terminal wireless link information notification section for receiving from the remote entity a request for local wireless link information of the local terminal and for sending the local wireless link information to the remote communicating entity.

13. A gateway device for controlling transfer of data between a first terminal device on a wired network and a second terminal device on a wireless network, the gateway device comprising:
 a first interface section for sending and receiving packets via the wireless network,
 a second interface section for sending and receiving packets via the wired network,
 a first link setting section for setting a link for control and for data transfer with the second terminal device;
 a second link setting section for setting a link with the first terminal device;
 a wireless link information acquisition section for acquiring wireless link information indicating a condition of a wireless link between the gateway device and the second terminal device on the wireless network at the time of setting the link, and for updating the wireless link information acquired at the time of setting the link by the current dynamically acquired wireless link information, the wireless link information including at least transmittable bandwidth information;
 a wireless link information storage section for storing the acquired or updated wireless link information as Descriptor information referable by the first and second terminal devices; and
 a network connection processor for, based on the wireless link information stored in the wireless link information storage section, performing receiving or sending of data between the first terminal device and the second terminal device via the first interface section and the second interface section.

14. The gateway device according to claim 13, further comprising: a local terminal wireless link information sending section for, in response to a request from the first terminal device on the wired network or from the second terminal device on the wireless network, for sending local wireless link information to the first terminal device or the second terminal device, respectively.

15. The gateway device according to claim 13, wherein the wireless link information acquisition section includes:
 a remote link information requesting section for requesting notification of the remote link information of the second terminal device to the first terminal device on the wired network; and
 a remote link information receiving section for receiving remote link information, notification of which is made by the first terminal device.

16. A method for controlling transfer of data via a wireless link with a remote communicating entity over a network, comprising:

setting a link for control with the remote communicating entity;

acquiring wireless link information indicating a condition of a wireless link between a local terminal device and the remote communicating entity at the time of setting the link, the wireless link information including at least transmittable bandwidth information;

setting a link for data transfer with the remote communicating entity;

updating wireless link information acquired at the time of setting of the link with current dynamically acquired wireless link information acquired after the setting of the link for data transfer;

storing the acquired or updated wireless link information as Descriptor information referable by the remote communicating entity;

determining whether or not transfer of data is possible, based on the updated wireless link information; and changing a transmission rate for transfer of data with the remote communicating entity, in accordance with wireless link information in the case in which data transfer is possible, and performing receiving or sending of content data with the remote communicating entity, using the changed transmission rate.

17. The method according to claim 16, wherein the wireless link information includes wireless link information with regard to the local terminal device and information with regard the remote communicating entity.

18. The method according to claim 17, wherein the wireless link information updating includes:

requesting notification of the remote wireless link information of the remote communicating entity at the time of the startup of an application; and receiving wireless link information of the remote communicating entity, notification of which is made by the remote communicating entity.

19. A method for transfer of content data via a wireless link with a remote communicating party on a network, comprising:

setting a link for control with the remote communicating entity;

acquiring wireless link information indicating a condition of a wireless link between a local terminal device and the remote communicating entity on the network at the time of setting the link, the wireless link information including at least transmittable bandwidth information;

setting a link for data transfer with the remote communicating entity;

updating the wireless link information acquired at the time of setting of the link with current dynamically acquired wireless link information acquired after the setting of the link;

storing the acquired or updated wireless link information as Descriptor information referable by the remote communicating entity; and receiving a notification request sent from the remote communicating entity for the local wireless link information of the local terminal device, and sending to the remote communicating entity wireless link information of the local terminal device in response to the request.

20. A method for transfer of content data between a first terminal device on a wired network and a second terminal device on a wireless network, this method comprising:

setting a link for control with the second terminal device;

acquiring, at the time of setting of the link, wireless link information indicating a condition of a wireless link between the first terminal device and the second terminal device on the wireless network, the wireless link information including at least transmittable bandwidth information;

setting a link for data transfer with the second terminal device;

updating the wireless link information acquired at the time of setting the link with current dynamically acquired wireless link information acquired after the setting of the link;

setting a link with the first terminal device;

storing the acquired or updated wireless link information as Descriptor information referable by the first and second terminal devices; and performing receiving or sending of data between the first terminal device and the second terminal device, based on the wireless link information.

21. A terminal device for control of data between communicating entities on a network via a wireless link, comprising:

an interface section for performing sending and receiving of packets with a remote communicating entity;

a link setting section for setting a link for control and for data transfer with the remote communicating entity;

a wireless link information acquisition section for acquiring wireless link information indicating the condition of a wireless link between said terminal device and the remote communicating entity in the network at the time of setting the link, and for updating the wireless link information acquired at the time of setting the link by the current dynamically acquired wireless link information;

a wireless link information storage section for storing the acquired or updated wireless link information; and an application section for, based on the wireless link information stored in the wireless link information storage section, determining whether or not data can be transferred and, if data transfer is possible, optimizing a transfer parameter for transfer of data with the remote communicating entity, in accordance with the wireless link information, this transfer parameter being used to receive data from or send data to the remote communicating entity, via the interface section, wherein the wireless link information stored in the wireless link information storage section includes wireless link information with regard to the terminal device and wireless link information with regard to the remote communicating entity, and the wireless link information acquisition section includes:

a remote wireless link information requesting section for requesting notification of wireless link information with regard to the remote communicating entity that the remote communicating entity has, at the time of startup of the application; and a remote wireless link information receiving section for receiving wireless link information of the remote communicating entity, notification of which is made from the remote communicating entity.

22. A gateway device for controlling transfer of data between a first terminal device on a wired network and a second terminal device on a wireless network, the gateway device comprising:

a first interface section for sending and receiving packets via the wireless network, a second interface section for sending and receiving packets via the wired network, a first link setting section for setting a link for control and for data transfer with the second terminal device;

a second link setting section for setting a link with the first terminal device;

a wireless link information acquisition section for acquiring wireless link information indicating a condition of a wireless link between the gateway device and the second terminal device on the wireless network at the time of setting the link, and for updating the wireless link information acquired at the time of setting the link by the current dynamically acquired wireless link information;

a wireless link information storage section for storing the acquired or updated wireless link information; and a network connection processor for, based on the wireless link information stored in the wireless link information storage section, performing receiving or sending of data between the first terminal device and the second terminal device via the first interface section and the second interface section, wherein the wireless link information acquisition section includes:

a remote link information requesting section for requesting notification of the remote link information of the second terminal device to the first terminal device on the wired network; and a remote link information receiving section for receiving remote link information, notification of which is made by the first terminal device.

23. A method for controlling transfer of data via a wireless link with a remote communicating entity over a network, comprising:

setting a link for control with the remote communicating entity;

acquiring wireless link information indicating a condition of a wireless link between a local terminal device and the remote communicating entity at the time of setting the link;

setting a link for data transfer with the remote communicating entity;

updating wireless link information acquired at the time of setting of the link with current dynamically acquired wireless link information acquired after the setting of the link for data transfer;

determining whether or not transfer of data is possible, based on the updated wireless link information; and optimizing a parameter for transfer of data with the remote communicating entity, in accordance with wireless link information in the case in which data transfer is possible, and performing receiving or sending of content data with the remote communicating entity, using the optimized parameter for transfer, wherein the wireless link information includes wireless link information with regard to the local terminal device and information with regard to the remote communicating entity, and the wireless link information updating includes:

requesting notification of the remote wireless link information of the remote communicating entity at the time of the startup of an application; and receiving wireless link information of the remote communicating entity, notification of which is made by the remote communicating entity.

* * * * *